US012117202B2

(12) United States Patent
Rigney et al.

(10) Patent No.: US 12,117,202 B2
(45) Date of Patent: Oct. 15, 2024

(54) METHOD AND SYSTEM FOR IMPLEMENTING ADVANCED OPERATING MODES IN ELECTRIC RESISTANCE WATER HEATERS AND HEAT PUMP WATER HEATERS

(71) Applicant: ALTUS THERMAL, INC., Melrose, MA (US)

(72) Inventors: Michael Rigney, Melrose, MA (US); Michael Ting, Boston, MA (US)

(73) Assignee: ALTUS THERMAL, INC., Melrose, MA (US)

( * ) Notice: Subject to any disclaimer, the term of this patent is extended or adjusted under 35 U.S.C. 154(b) by 0 days.

(21) Appl. No.: 17/912,319

(22) PCT Filed: Mar. 16, 2021

(86) PCT No.: PCT/US2021/022530
§ 371 (c)(1),
(2) Date: Sep. 16, 2022

(87) PCT Pub. No.: WO2021/188515
PCT Pub. Date: Sep. 23, 2021

(65) Prior Publication Data
US 2023/0112157 A1  Apr. 13, 2023

Related U.S. Application Data

(60) Provisional application No. 63/033,658, filed on Jun. 2, 2020, provisional application No. 62/990,316, filed
(Continued)

(51) Int. Cl.
*H05B 1/02* (2006.01)
*F24H 1/20* (2022.01)
(Continued)

(52) U.S. Cl.
CPC ........... *F24H 15/156* (2022.01); *F24H 1/202* (2013.01); *F24H 4/04* (2013.01)

(58) Field of Classification Search
CPC ...... F24H 15/144–15/172; F24H 1/202; F24H 4/04; F24H 9/2021
See application file for complete search history.

(56) References Cited

U.S. PATENT DOCUMENTS 6,076,365 A     6/2000  Benatav
6,118,099 A  *  9/2000  Lake ..................... B60H 1/2218
                                                 219/202
(Continued)

FOREIGN PATENT DOCUMENTS

CN      101245950 A       8/2008
JP    2011247513 A  *  12/2011
(Continued)

OTHER PUBLICATIONS

Toyoshima, original and translation JP-2011247513-A (Year: 2011).*
(Continued)

*Primary Examiner* — Steven S Anderson, II
(74) *Attorney, Agent, or Firm* — Lando & Anastasi, LLP

(57) ABSTRACT

A water heating system including a tank at least one of an electric heating element and/or a heat pump assembly for heating the water in the tank and a controller operatively coupled to the at least one of an electric resistance heating element and/or a heat pump assembly configured to control operation of the water heating system is disclosed. The controller is configured to gather information comprising at least one of user preferences for the system, specifications for energy related systems of a home in which the water heating system is installed, specifications for how the water heating system is physically configured within the home, environmental parameters for a location in which the water heating system is installed, and is configured to process this
(Continued)

information to control the water heater system to operate according to the information.

20 Claims, 19 Drawing Sheets

Related U.S. Application Data on Mar. 16, 2020, provisional application No. 62/990,290, filed on Mar. 16, 2020.

(51) Int. Cl.
*F24H 4/04* (2006.01)
*F24H 15/156* (2022.01)
*G05B 19/042* (2006.01)

(56) References Cited

U.S. PATENT DOCUMENTS

| | | | |
|---|---|---|---|
| 8,385,729 | B2 | 2/2013 | Kleman et al. |
| 8,930,037 | B2 | 1/2015 | Brian et al. |
| 9,124,098 | B2 | 9/2015 | Broniak et al. |
| 9,206,995 | B2 | 12/2015 | Nelson et al. |
| 9,482,446 | B2 | 11/2016 | Nomoto et al. |
| 9,657,965 | B2 | 5/2017 | Nolte et al. |
| 9,657,979 | B2 | 5/2017 | Yoshimi et al. |
| 9,739,392 | B2 * | 8/2017 | Shaffer .................. F16K 31/602 |
| 10,041,702 | B2 | 8/2018 | Lowrimore et al. |
| 10,203,129 | B2 | 2/2019 | Moore et al. |
| 10,378,805 | B2 | 8/2019 | Jin et al. |
| 10,502,451 | B2 | 12/2019 | Khatami |
| 10,770,897 | B1 | 9/2020 | Hertz-Shargel et al. |
| 10,895,387 | B2 | 1/2021 | Chaudhry |
| 11,300,325 | B2 | 4/2022 | Branecky et al. |
| 2006/0032606 | A1 * | 2/2006 | Thybo .................. B60H 1/3227 374/7 |
| 2010/0206869 | A1 * | 8/2010 | Nelson .................. F24H 15/136 392/441 |
| 2010/0262403 | A1 | 10/2010 | Gordon et al. |
| 2011/0172830 | A1 * | 7/2011 | Milder ............... G05D 23/1923 700/277 |
| 2011/0308481 | A1 | 12/2011 | Gordon et al. |
| 2012/0023990 | A1 * | 2/2012 | Nelson .................... F24H 1/185 62/238.7 |
| 2012/0034990 | A1 | 2/2012 | Cohen et al. |
| 2012/0060534 | A1 | 3/2012 | Zhang et al. |
| 2012/0145095 | A1 | 6/2012 | Nelson et al. |
| 2014/0157814 | A1 | 6/2014 | Duplessis et al. |
| 2015/0184889 | A1 | 7/2015 | Shaffer et al. |
| 2015/0354833 | A1 | 12/2015 | Kreutzman |
| 2016/0040906 | A1 | 2/2016 | Aguilar et al. |
| 2016/0069574 | A1 | 3/2016 | Tsai |
| 2016/0084526 | A1 | 3/2016 | Farris et al. |
| 2016/0097573 | A1 | 4/2016 | Shaffer et al. |
| 2016/0109154 | A1 | 4/2016 | Shaffer et al. |
| 2017/0003050 | A1 | 1/2017 | Ward et al. |
| 2017/0038094 | A1 | 2/2017 | Poehlman et al. |
| 2017/0108241 | A1 | 4/2017 | Boros et al. |
| 2017/0122634 | A1 | 5/2017 | Shaffer |
| 2017/0343241 | A1 | 11/2017 | Chen et al. |
| 2017/0356660 | A1 | 12/2017 | Branecky et al. |
| 2017/0371308 | A1 * | 12/2017 | Ghosh .................... G05B 15/02 |
| 2018/0287388 | A1 | 10/2018 | Bates |
| 2018/0313579 | A1 | 11/2018 | Yin et al. |
| 2019/0040873 | A1 | 2/2019 | Tadokoro et al. |
| 2020/0041168 | A1 | 2/2020 | Branecky et al. |
| 2020/0175534 | A1 * | 6/2020 | Aggarwala ............. G01W 1/02 |
| 2020/0191433 | A1 | 6/2020 | Yin et al. |
| 2020/0220378 | A1 | 7/2020 | Trant et al. |
| 2020/0263896 | A1 | 8/2020 | Puranen et al. |
| 2020/0371485 | A1 | 11/2020 | Matsumura |
| 2020/0386444 | A1 | 12/2020 | Pugh et al. |
| 2021/0199344 | A1 | 7/2021 | Branecky et al. |

FOREIGN PATENT DOCUMENTS

| | | | | |
|---|---|---|---|---|
| WO | WO-2007098526 | A1 * | 9/2007 | .......... F24D 11/0214 |
| WO | 2011036525 | A1 | 3/2011 | |
| WO | 2014197225 | A1 | 12/2014 | |
| WO | 2019026801 | A1 | 2/2019 | |

OTHER PUBLICATIONS

International Search Report and Written Opinion for International Application No. PCT/US2021/022530 mailed Aug. 6, 2021.

* cited by examiner

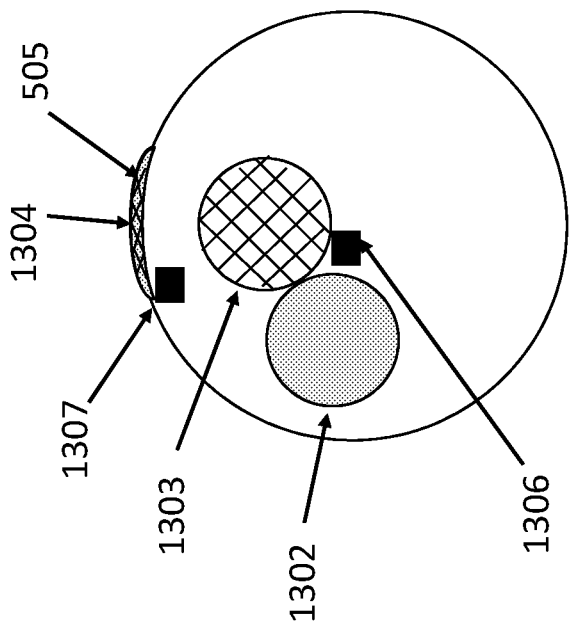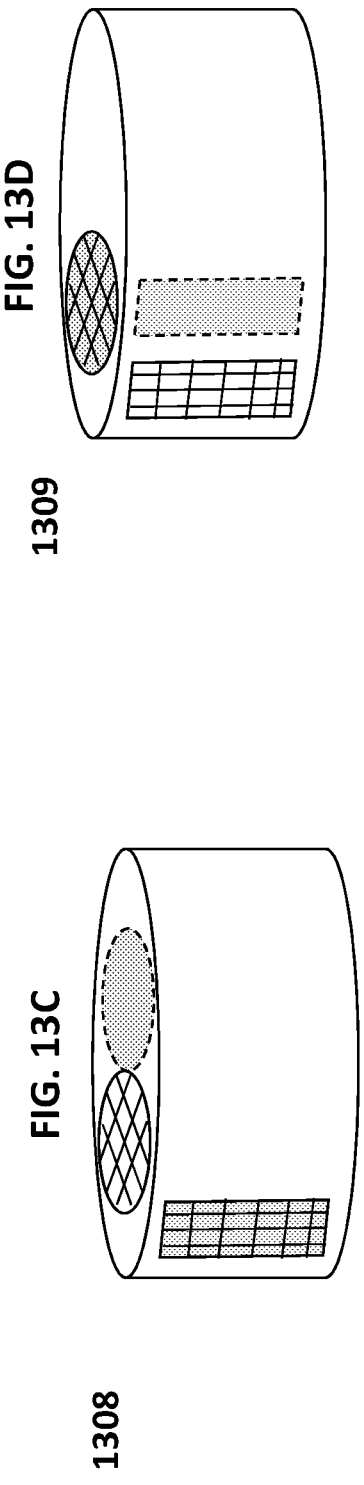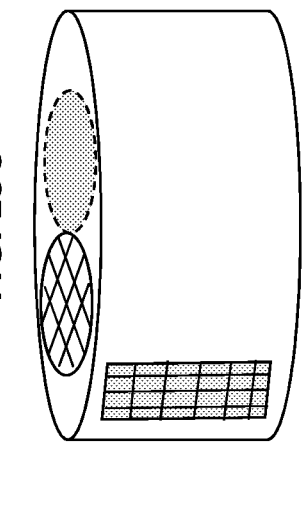

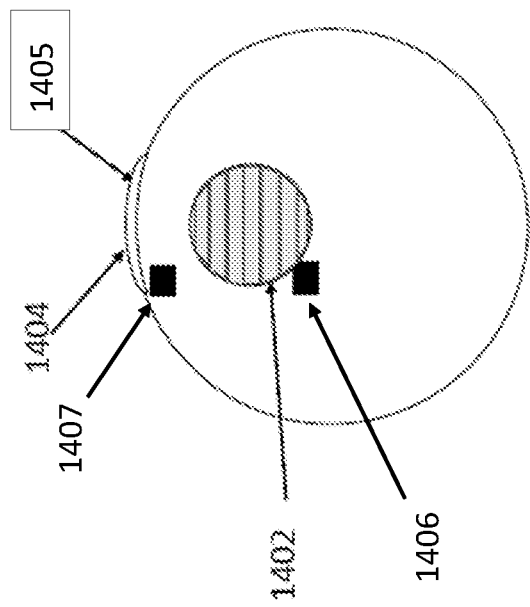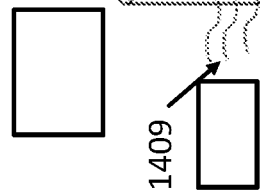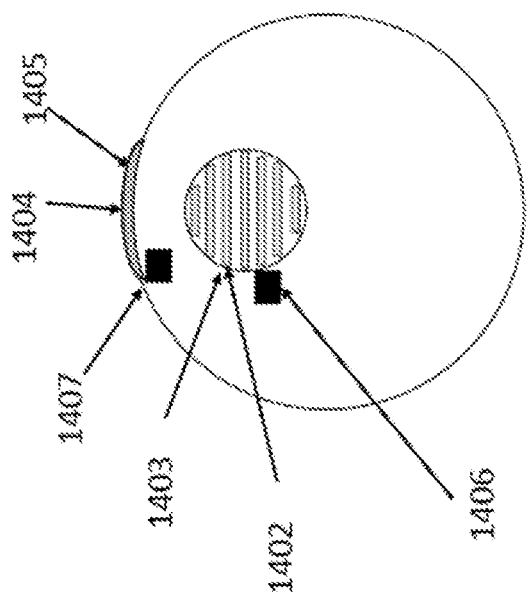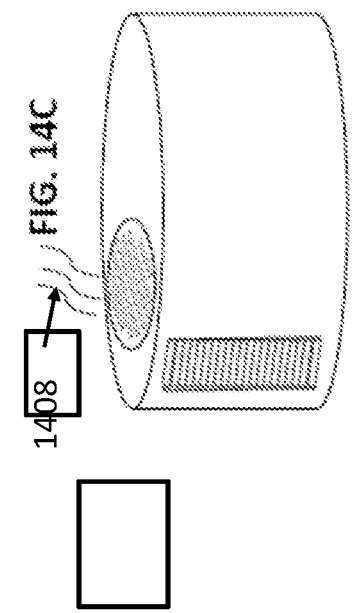
FIG. 14A
FIG. 14B
FIG. 14C
FIG. 14D

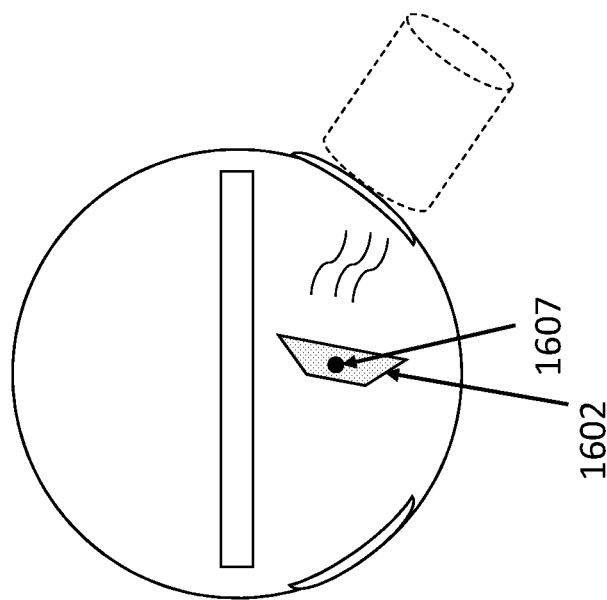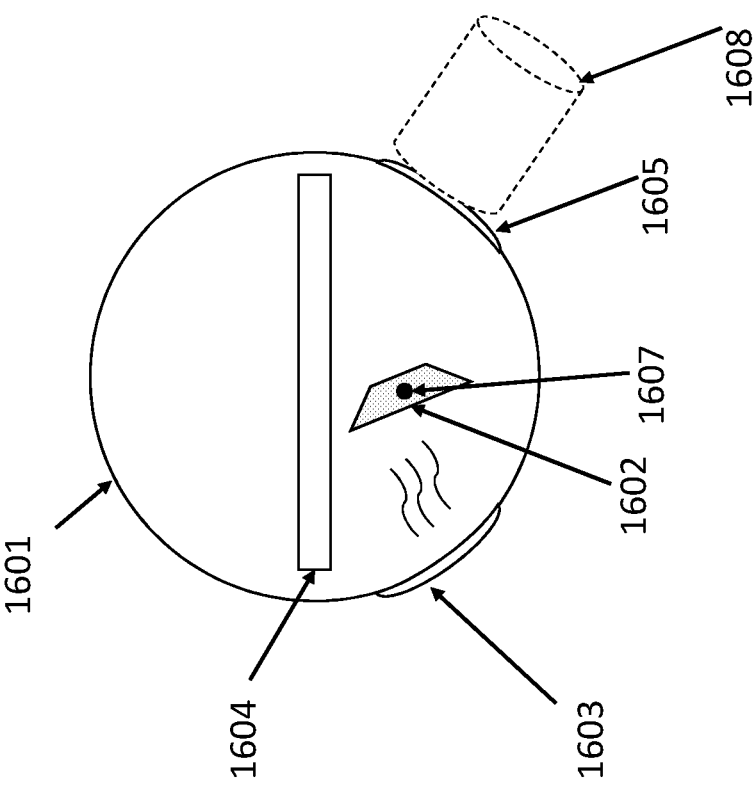
FIG. 16A
FIG. 16B

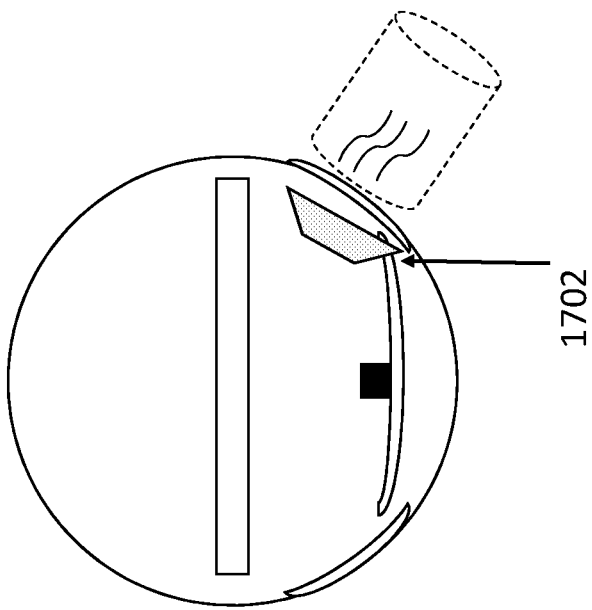
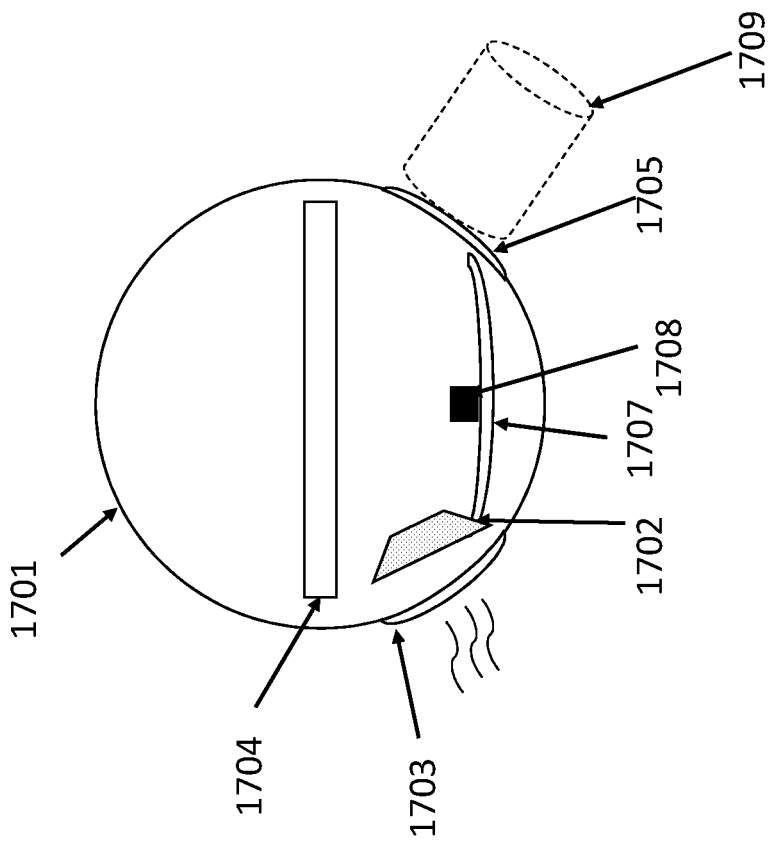
FIG. 17A
FIG. 17B

METHOD AND SYSTEM FOR IMPLEMENTING ADVANCED OPERATING MODES IN ELECTRIC RESISTANCE WATER HEATERS AND HEAT PUMP WATER HEATERS

CROSS REFERENCE TO RELATED APPLICATIONS

This application is a U.S. National Phase Application under 35 U.S.C. § 371 of International Application No. PCT/US2021/022530, filed Mar. 16, 2021, which claims priority to U.S. Provisional Application No. 62/990,316, filed Mar. 16, 2020, and U.S. Provisional Application No. 62/990,290 filed Mar. 16, 2020, and U.S. Provisional Application No. 63/033,658 filed Jun. 2, 2020, the content of the aforementioned applications are hereby incorporated by reference in their entirety.

FIELD OF INVENTION

This disclosure relates to a method and system for operating water heaters, more specifically electric resistance water heaters and heat pump water heaters, sometimes referred to as "hybrid" water heaters.

BACKGROUND

Electric water heaters use one or more heating elements, generally but not exclusively electric resistance elements, to heat water. Electric heat pump water heaters (also known as hybrid water heaters) use one or more heating elements and an air source heat pump to heat water.

Electric tank water heaters are controlled in response to the difference between the temperature of the water as measured by one or more temperature sensors in the tank and the temperature setpoint, that temperature setpoint being set by the user. Heat pump water heaters are further controlled by modes which utilize the heating elements or the heat pump more or less in responding to temperature differences between the setpoint and the measured temperature. Some of these modes prevent the use of the heat pump or the heating elements while that mode is operational.

The temperature setpoint may be static or variable according to a schedule set by the user. Electric water heaters may also be controlled according to schedules that increase or decrease water heating during periods of lower or higher electricity prices. These prices, sometimes called Time of Use rates, may be programmed into a water heater controller. Electric water heaters may also be controlled by signals to increase or decrease water heating and thus electricity use in response to economic or operational conditions on the electric grid in the operative region in which the water heater is installed.

Heat pump water heaters expel cooled and dehumidified air which has passed through the evaporator. This cooling and dehumidifying effect may be beneficial or detrimental. As an example, the cooling and dehumidification effect provided by a heat pump water heater may provide a reduction in air conditioning expense if the unit utilizes air from the conditioned space of the home. The same cooling and dehumidification effect may also increase heating expense if the unit utilizes air from the conditioned space of the home. In addition, the coefficient of performance (COP) of a heat pump water heater, a measurement of overall system efficiency, increases as the temperature of the air entering the heat pump water heater increases.

Current methods and systems for operating water heaters, including heat pump water heaters, suffer from limitations.

SUMMARY OF THE INVENTION

In one aspect, a water heater system includes water heaters that use one or more heating elements, electric heat pump water heaters (hybrid water heaters) and/or a combination of the two. In general, in one aspect, a method and system for controlling a water heater system are disclosed. Aspects and embodiments are directed to a method and system for controlling a water heater system including enabling, activating, and deactivating water heater operating modes. Aspects and embodiments are directed to various systems and methods for the operation of a heat pump water heater (sometimes called a "hybrid" water heater) to better meet preferred goals of the home occupants. Aspects and embodiments are directed to a heat pump water heater that can be integrated with other home energy systems and respond to information external to the water heater system. Aspects and embodiments are directed to a heat pump water heater system that enables one or more users to provide input to the water heater via a control panel on a water heater or via a software application downloaded to their phone, tablet, computer, or other similar device.

Aspects and embodiments are directed to a system and method for gathering information about the energy systems of the home and the preferences of the home occupant(s), and using this information to preferentially control the water heater to operate in a manner according to the preferences. Aspects and embodiments include providing for operation in any or all of Distributed Generation Mode, Back-Up Generation Mode, GHG Minimization Mode, Space Heating/Cooling System Integration Mode, and Inlet/Outlet Control Mode, which is for heat pump water heaters with controllable ducting. Aspects and embodiments are directed to an internet-enabled software application that is also communicatively coupled to a cloud-based software infrastructure (i.e. "The Internet of Things" or IOT). Aspects and embodiments provide for communication with third party data sources, integration with other devices and systems at the customer location, and/or external sensors.

Aspects and embodiments include a system and method for implementing and controlling the airflow of a heat pump water heater having at least three air openings in the heat pump casing of a heat pump water heater that encloses the heat pump sub-assembly of the heat pump water heater. Aspects and embodiments include a system and method for automatically, and/or manually by a user, controlling the at least three air openings to be either open, closed, or partially open so as to control airflow. Aspects and embodiments provide for multiple configurations and implementations of at least three air openings. Aspects and embodiments of a system and method provide the heat pump water heater with more than one air source (i.e. an air "inlet"). Aspects and embodiments of a system and method provide the ability to select between these air sources with physical mechanisms and a control system to operate the physical mechanisms. Aspects and embodiments of the physical mechanisms comprise dampers. Aspects and embodiments of a system and method provide the heat pump water heater with at least three air openings to provide the heat pump water heater with more than one air sink (i.e. an air "outlet"). Aspects and embodiments of a system and method provide the ability to select between these air sinks. Aspects and embodiments of a system and method provide to select between the air sinks with any of multiple fans, a rotating fan, and/or a fan that can move within the heat pump casing along with a control system to control these elements. Aspects and embodiments of a system and method having at least three air openings provide controllable multiple air inlets and/or outlets to enable the heat pump water heater to utilize a different air source and/or sink depending on a variety of parameters including environmental conditions, user preferences, total home energy usage, and more.

In one aspect, a water heating system includes a tank configured for storing water, at least one of an electric heating element and/or a heat pump assembly for heating the water in the tank, and a controller operatively coupled to the at least one of the electric heating element and the heat pump assembly that is configured to control operation of the water heating system. The controller comprises an interface configured for gathering information comprising at least one of user preferences for the system, specifications for energy-related systems of a home in which the water heating system is installed, specifications for how the water heating system is physically configured within the home, environmental parameters for a location in which the water heating system is installed, greenhouse gas intensity for a location in which the water heating system is installed, and information regarding electrical blackouts for a location in which the water heating system is installed. The user preferences comprises at least one of that the water heating system is to operate with a lowest possible operating costs, that the water heating system is to operate with a highest possible efficiency, that the water heating system is to provide a highest possible efficiency of the overall home, that the water heating system is not to impact comfort of a particular space to which it is thermally coupled by airflow, that the water heating system is to operate with lowest possible greenhouse gas emissions, that the water heating system is to minimize greenhouse gas emissions of the home overall, that the water heating system is to operate with the fastest possible heating, and that the water heating system is to balance these user preferences. The controller is configured to process the information to control the water heater system to operate according to the information.

Aspects and embodiments include that the user preferences do not comprise selection of predefined operating modes for a heat pump water heater.

Aspects and embodiments include that the information about the specification for the energy-related systems of the home comprises any of information about a heating system, a cooling system, distributed generation systems, back-up power sources, presence of intelligent electrical panels, and presence of other smart home controller technologies.

Aspects and embodiments include that the information about the specifications for how the water heating system is physically configured within the home comprises any of its location within the home, what type of heating and/or cooling systems are used in the home, whether the heating and/or cooling systems are thermally coupled to the water heating system, and whether any of the air openings are connected to ductwork, how many openings the ductwork has, whether that ductwork has any openings controllable dampers to open and close the openings, how those controllable dampers are controlled, and where those multiple air openings are ducted to.

Aspects and embodiments include that the controller comprises a set up mode that includes at least one of a plurality of operating modes including distributed generation mode, a back-up power supply mode, a minimum GHG content mode, a space heating and cooling mode, and an air inlet and outlet control mode can be activated or deactivated by a user.

Aspects and embodiments include that the controller is configured to allow the user to enable or disable at least one mode of the plurality of operating modes.

Aspects and embodiments include that the distributed generation mode comprises receiving ay of utility rate information; weather forecast information; wind generation production forecast information; solar system production forecast information; voltage information; and distributed generation system information from the distributed generation system or from a smart electrical panel, and a smart home controller or equivalent; and processing this information to control the water heater to increase or decrease the coincidence of water heating with a distributed generation system.

Aspects and embodiments include that the backup power supply mode comprises receiving any of back-up power supply information directly from the back-up power supply system or from a user, a smart electrical panel, a smart home controller, a voltage sensor, and an outage duration analysis; and processing this information to control the water heater to increase or decrease energy consumption of water heating while the heating system is operating by a back-up power supply.

Aspects and embodiments include that the minimum greenhouse gas minimization mode comprises receiving any of information regarding current greenhouse gas intensity or upcoming greenhouse gas intensity of local electricity and processing this information to control the water heater to reduces water heating during times that supplied electricity has carbon content greater than a first threshold and increases water heating during times the electricity is below a second threshold.

Aspects and embodiments include that the heating and cooling system integration mode comprises receiving any of a weather forecast and space heating and cooling system information from any of the space heating and cooling system, a smart electrical panel, and a smart home controller; and processing this information to decrease energy consumption of water heating when desuperheating heat is provided.

Aspects and embodiments include that the inlet outlet control mode comprises receiving any of information about the space heating and cooling systems, information about ducting configuration, information about user preference settings, a weather forecast, and space heating and cooling system operational information from any of space heating and cooling system, a smart electrical panel, and a smart home controller, and processing this information to alter the ducting configuration to optimize performance according to user preferences.

Aspects and embodiments include that a communication interface is configured to collect external information from the internet.

Aspects and embodiments include that the controller is further configured to receive data from any of an intelligent electric panel, a distributed generation system, a back-up power source that provides information on one or more energy using systems in the home, and uses this information to further control the water heating system.

Aspects and embodiments include that the water heating system is a heat pump water heater and further comprises a casing enclosing the heat pump system, the casing including at least two air openings. The system further comprises an interface configured to receive information about the configuration of the heat pump water heater and the at least two air openings. The information comprises at least one of its location within a home, whether any of the at least two air openings are connected to ductwork, how many openings the ductwork has, whether the ductwork has controllable dampers to open and close the openings, whether any of the controllable dampers are controlled by actuators, where the air openings are ducted to, what type of heating and cooling system is used in the home, and user preferences for how the heat pump water heater is to operate. The controller processes the information to send a control signal to the dampers in the ductwork or to a user for hand operation of the dampers, and the processor also processes the information to control the heat pump water heater system.

Aspects and embodiments include that the water heating system is a heat pump water heater and further comprises a casing enclosing the heat pump system, the casing including at least three air openings for receiving air through at least a first air opening and exhausting air through at least a second air opening. The system further comprises at least one controllable damper and actuator within the casing, the damper being coupled to at least one of the air openings such that its position is movable and to enable or prevent airflow through the at least one opening. The system further comprises an interface configured to receive information about a configuration of the heat pump water heater and the at least three air openings including at least one of its location within a home, which of the at least three air openings are connected to ductwork and where the air openings are ducted to, what type of heating and cooling system is used with the heat pump water heater system, and user preferences for how the heat pump water heater is to operate. The controller processes the information to control the actuator to control the position of the damper, and the controller processes the information to control the heat pump water heater system.

Aspects and embodiments include further include at least one temperature sensor inside the casing that measures air temperature from the air openings, the temperature sensor in communication with the controller, and wherein the controller processes the information to control the heat pump water heater system.

Aspects and embodiments include that the controller is configured to estimate an air temperature from air coming from air openings based on sensors in the water heating system, including at least one of a temperature sensor in the tank, electrical consumption of the compressor, and temperature of the refrigerant returning from the compressor, and wherein the controller processes the information to control the heat pump water heater system.

Aspects and embodiments include that the water heating system is a heat pump water heater and further comprises a casing enclosing the heat pump system, the casing including at least two air openings, and at least one movable structure coupled to an exterior of the casing enclosing the heat pump system, wherein the at least one movable structures contains at least two openings, the movable structure constructed and arranged to be moved to position each of the at least two openings of the movable structure over at least one of the at least two openings in the casing for receiving or exhausting air.

In one aspect, a water heating system includes a tank configured for storing water and including at least one heating element for heating water stored in the water tank, a heat pump system coupled to the tank for heating and/or maintaining a temperature of water in the tank, the heat pump system being disposed in an enclosed space proximate the tank, a casing enclosing the heat pump system to provide the enclosed space, the casing including at least three air openings for receiving air through at least a first air opening and exhausting air through at least a second air opening, and a controller operatively coupled to the heating element and the heat pump system for controlling an operation of the heat pump water heating system.

Aspects and embodiments include at least one sealing device configured to enable and prevent airflow through at least one of the at least three air openings.

Aspects and embodiments include that the at least three air openings includes four air openings comprising two air inlets and two air outlets, and wherein the at least one sealing device comprises four sealing devices, each sealing device coupled to a respective air inlet or air outlet.

Aspects and embodiments include that each sealing device includes a damper coupled to an actuator that is operatively coupled to the controller, and wherein the controller is configured to control the actuator so as to move the damper between a first position covering the respective air opening and a second position at least partially uncovering the respective air opening.

Aspects and embodiments include that each sealing device includes louvres coupled to an actuator that is operatively coupled to the controller, and wherein the controller is configured to control the louvres to rotate between a first position covering the respective air opening and a second position at least partially uncovering the respective air opening.

Aspects and embodiments include that the at least three air openings includes at least one air inlet and two air outlets, and the heat pump system further comprises at least one fan configured to move air through the casing between the at least one air inlet and the at least two air outlets.

Aspects and embodiments include first and second fans operatively coupled to the controller and configured for venting air out of the first and second air outlets.

Aspects and embodiments include first and second sealing devices operatively coupled to the controller and configured to enable and prevent airflow through the first and second air outlets.

Aspects and embodiments include at least one fan operatively coupled to the controller and is coupled to an actuator operatively coupled to the controller that is configured to move the fan between first and second positions for venting air out of the respective first and second air outlets.

Aspects and embodiments include that the first and second air openings are on the side of the casing and the at least one fan is moved along a horizontal plane between first and second positions.

Aspects and embodiments include that the first air opening is on the side of the casing and the second air opening is on the top of the casing and the at least one fan is moved along a vertical plane between first and second positions.

Aspects and embodiments include that controller comprises a communication interface configured for gathering information comprising at least one of user preferences for the system, specifications for energy-related systems of a home in which the water heating system is installed, specifications for how the water heating system is physically configured within the home, environmental parameters for a location in which the water heating system is installed, greenhouse gas intensity for a location in which the water heating system is installed, and information regarding electrical blackouts for a location in which the water heating system is installed, and wherein the controller processes the information to control the heat pump water heater system.

Aspects and embodiments include that the information about the specification for the energy-related systems of the home comprises any of information about a heating system, a cooling system, distributed generation systems, back-up power sources, presence of intelligent electrical panels, and presence of other smart home controller technologies, and wherein the controller processes the information to control the heat pump water heater system.

Aspects and embodiments include that the information about the specifications for how the water heating system is physically configured within the home comprises at least one of its location within a home, which of the at least three air openings are connected to ductwork and where such air openings are ducted to, what type of heating and cooling system is used in the home, and user preferences for how the heat pump water heater is to operate, and wherein the controller processes the information to control the heat pump water heater system.

Aspects and embodiments include that the information about the user preferences includes any of that the water heater system is to operate with lowest possible operating costs, that the water heating system is to operate with highest possible efficiency, that the water heating system is to operate to provide highest possible efficiency in the home overall, that the water heater is not to impact the comfort of a particular space to which it is connected by air flow, that the water heating system is to operate with lowest possible greenhouse gas emissions, that the water heating systems is to minimize greenhouse gas emissions of the home overall, that the water heating systems is to operate with the fastest possible heating, and that the water heating system is to balance these user preferences, and wherein the controller processes the information to control the heat pump water heater system.

Aspects and embodiments include that the user preferences do not comprise selection of predefined operating modes for a heat pump water heater.

Aspects and embodiments include that the controller comprises a set up mode that includes at least one of a plurality of operating modes including distributed generation mode, a back-up power supply mode, a minimum GHG content mode, a space heating and cooling mode, and an air inlet and outlet control mode can be activated or deactivated by a user.

Aspects and embodiments include that the controller is configured to allow the user to enable or disable at least one mode of the plurality of operating modes.

Aspects and embodiments include that the distributed generation mode comprises receiving ay of utility rate information; weather forecast information; wind generation production forecast information; solar system production forecast information; voltage information; and distributed generation system information from the distributed generation system or from a smart electrical panel, and a smart home controller or equivalent; and processing this information to control the water heater to increase or decrease the coincidence of water heating with a distributed generation system.

Aspects and embodiments include that the backup power supply mode comprises receiving any of back-up power supply information directly from the back-up power supply system or from a user, a smart electrical panel, a smart home controller, a voltage sensor, and an outage duration analysis; and processing this information to control the water heater to increase or decrease energy consumption of water heating while the heating system is operating by a back-up power supply.

Aspects and embodiments include that the minimum greenhouse gas minimization mode comprises receiving any of information regarding current greenhouse gas intensity or upcoming greenhouse gas intensity of local electricity and processing this information to control the water heater to reduces water heating during times that supplied electricity has carbon content greater than a first threshold and increases water heating during times the electricity is below a second threshold.

Aspects and embodiments include that the heating and cooling system integration mode comprises receiving any of a weather forecast and space heating and cooling system information from any of the space heating and cooling system, a smart electrical panel, and a smart home controller; and processing this information to decrease energy consumption of water heating when desuperheating heat is provided.

Aspects and embodiments include that the inlet outlet control mode comprises receiving any of information about the space heating and cooling systems, information about ducting configuration, information about user preference settings, a weather forecast, and space heating and cooling system operational information from any of space heating and cooling system, a smart electrical panel, and a smart home controller, and processing this information to alter the ducting configuration to optimize performance according to user preferences.

In one aspect, a water heating system comprises a tank configured for storing water, at least one of an electric heating element and/or a heat pump assembly for heating the water in the tank and a controller operatively coupled to the at least one of an electric resistance heating element and/or a heat pump assembly configured to control operation of the water heating system. The controller comprises an interface configured for gathering information comprising at least one of user preferences for the system, specifications for energy-related systems of a home in which the water heating system is installed, specifications for how the water heating system is physically configured within the home, environmental parameters for a location in which the water heating system is installed, and information regarding future electrical blackouts. The user preferences comprises at least one of that the water heating system is to operate with a lowest possible operating costs, that the water heating system is to operate with a highest possible efficiency, that the water heating system is to provide a highest possible efficiency of the overall home, that the water heating system is not to impact comfort of a particular space to which it is thermally coupled by airflow, that the water heating system is to operate with lowest possible greenhouse gas emissions, that the water heating system is to minimize greenhouse gas emissions of the home overall, that the water heating system is to operate with the fastest possible heating, and that the water heating system is to balance these user preferences. The controller is configured to process this information to control the water heater system to operate according to the information and user preferences.

Aspects and embodiments include that the specification for the energy-related systems of the home comprise any of information about a heating system, a cooling system, distributed generation systems, back-up power sources, presence of intelligent electrical panels, and presence of other smart home controller technologies.

Aspects and embodiments include that the specifications for how the water heating system is physically configured within the home comprise any of its location within the home, what type of heating and/or cooling systems are used in the home, whether the heating and/or cooling systems are thermally coupled to the water heating system, and whether any of the air openings are connected to ductwork, how many openings the ductwork has, whether that ductwork has any openings controllable dampers to open and close the openings, how those controllable dampers are controlled, and where those multiple air openings are ducted to.

Aspects and embodiments include the controller comprises a set up mode to enable or disable any one of a distributed generation mode, a back-up power supply mode, a minimum GHG content mode, a space heating and cooling mode, and an air inlet and outlet control mode can be activated or deactivated by a user.

Aspects and embodiments include the controller is configured to provide a user interface comprising a slider bar to request a user's input as to how much to reduce hot water heating while operating in back up power mode and a radio bar for the user to select one of a plurality of preferences.

Aspects and embodiments include the distributed generation mode comprises receiving any of utility rate information; weather forecast information; wind generation production forecast information; solar system production forecast information; voltage information; and distributed generation system information from the distributed generation system or from a smart electrical panel, and a smart home controller or equivalent; and processing this information to control the water heater to increase or decrease the coincidence of water heating with a distributed generation system.

Aspects and embodiments include the backup power supply mode comprises receiving any of back-up power supply information directly from the back-up power supply system or from a user, a smart electrical panel, a smart home controller, a voltage sensor, and an outage duration analysis; and processing this information to control the water heater to increase or decrease energy consumption of water heating while the heating system is operating by a back-up power supply.

Aspects and embodiments include the controller provides a user interface comprising a slider bar to request a user's input as to how much to reduce hot water heating while operating in back up power mode and a radio bar for the user to select one of a plurality of preferences.

Aspects and embodiments include the Minimum Greenhouse Gas Minimization mode comprises receiving any of information regarding current greenhouse gas intensity or upcoming greenhouse gas intensity of local electricity and processing this information to control the water heater to reduce water heating during times that supplied electricity has carbon content greater than a first threshold and increases water heating during times the electricity is below a second threshold.

Aspects and embodiments include the controller provides a user interface comprising a slider bar to request a user's input as to heating the hot water when carbon emissions from producing electricity is below the second threshold and a radio bar for the user to select one of a plurality of preferences.

Aspects and embodiments include the heating and cooling system integration mode comprises receiving any of a weather forecast, space heating and cooling system information from any of the space heating and cooling system, a smart electrical panel, and a smart home controller; and processing this information to decrease energy consumption of water heating when desuperheating heat is provided.

Aspects and embodiments include the inlet outlet control mode comprises receiving any of information on the space heating and cooling systems, information on ducting configuration, information on user preference settings, a weather forecast, space heating and cooling system operational information, from any of space heating and cooling system, a smart electrical panel, and a smart home controller; and processing this information to alter the ducting configuration to optimize performance according to user preferences.

Aspects and embodiments include a communication interface configured to collect external information from the internet.

Aspects and embodiments include the controller is further configured to receive data from any of an intelligent electric panel, a distributed generation system, a back-up power source that provides information on one or more energy using systems in the home, and uses this information to further control the water heating system.

Aspects and embodiments include the water heating system is a heat pump water heater and further comprises a casing enclosing the heat pump system, the casing including at least two air openings. The system further comprises an interface configured to receive information about the configuration of the heat pump water heater and the at least two air openings. The information comprises at least one of its location within a home, whether any of the at least two air openings are connected to ductwork, how many openings the ductwork has, whether the ductwork has any openings with actuators and controllable dampers to open and close the openings, where the air openings are ducted to, what type of heating and cooling system is used in the home, and user preferences for how the heat pump water heater is to operate. The controller processes the information to send a control signal to the dampers in the ductwork or to a responsible user for hand operation of the dampers, and to control the heat pump water heater system.

Aspects and embodiments include the water heating system is a heat pump water heater and further comprises a casing enclosing the heat pump system, the casing including at least three air openings for receiving air through at least a first air opening and exhausting air through at least a second air opening.

Aspects and embodiments include at least one controllable damper and actuator within the casing, the damper being coupled to at least one of the air openings such that its position is movable and controls airflow through the at least one opening.

Aspects and embodiments include an interface configured to receive information about a configuration of the heat pump water heater and the at least three air openings including at least one of its location within a home, which of the at least three air openings are connected to ductwork and where the air openings are ducted to, what type of heating and cooling system is used with the heat pump water heater system, and user preferences for how the heat pump water heater is to operate. The controller processes the information to control the actuator to control the position of the damper and controls the heat pump water heater system.

Aspects and embodiments include at least one temperature sensor inside the casing that measures air temperature from the different air openings for receiving air, the temperature sensor in communication with the controller, and wherein the controller processes the information to control the heat pump water heater system.

Aspects and embodiments include the controller is configured to estimate an air temperature from air coming from different air openings based on sensors in the water heating system, including at least one of a temperature sensor in the tank, electrical consumption of the compressor, and temperature of the refrigerant returning from the compressor, and wherein the controller processes the information to control the heat pump water heater system.

In one aspect, a water heating system comprises a tank configured for storing water and including at least one heating element for heating water stored in the water tank, a heat pump system coupled to the tank for heating and/or maintaining a temperature of water in the tank, a casing enclosing the heat pump system to provide an enclosed space, the casing including at least three air openings for receiving air through at least a first air opening and exhausting air through at least a second air opening, and a controller operatively coupled to the heating element and the heat pump system for controlling an operation of the heat pump water heating system.

Aspects and embodiments include at least one sealing device configured to enable and prevent airflow through at least one of the at least three air openings.

Aspects and embodiments include four air openings comprising two air inlets and two air outlets, and wherein the at least one sealing device comprises four sealing devices, each sealing device coupled to a respective air inlet or air outlet. Each sealing device includes a damper coupled to an actuator that is operatively coupled to the controller, and wherein the controller is configured to control the actuator so as to move the damper between a first position covering the respective air opening and a second position at least partially uncovering the respective air opening.

Aspects and embodiments include each sealing device comprising louvres coupled to an actuator that is operatively coupled to the controller, and wherein the controller is configured to control the louvres to rotate between a first position covering the respective air opening and a second position at least partially uncovering the respective air opening.

Aspects and embodiments include at least one air inlet and two air outlets, and the heat pump system further comprises at least one fan configured to move air through the casing between the at least one air inlet and the at least two air outlets.

Aspects and embodiments include at least one fan comprising respective first and second fans operatively coupled to the controller and configured for venting air out of the first and second air outlets.

Aspects and embodiments include first and second sealing devices operatively coupled to the controller and configured to enable and prevent airflow through the first and second air outlets.

Aspects and embodiments include at least one fan is operatively coupled to the controller and an actuator operatively coupled to the controller and configured to move the fan between first and second positions for venting air out of the respective first and second air outlets.

Aspects and embodiments include first and second sealing devices operatively coupled to the controller and configured to enable and prevent airflow through the first and second air outlets. The first and second air openings are on the side of the casing and the fan is moved along a horizontal plane between first and second positions. The first air opening is on the side of the casing and the second air opening is on the top of the casing and the fan is moved along a vertical plane between first and second positions.

Aspects and embodiments include first and second sealing devices operatively coupled to the controller and configured to enable and prevent airflow through the first and second air outlets. The first air opening is on the side of the casing and the second air opening is on the top of the casing and the fan is moved along a vertical plane between first and second positions.

Aspects and embodiments include first and second sealing devices operatively coupled to the controller and configured to enable and prevent airflow through the first and second air outlets. The first and second air openings are on the side of the casing and the fan is moved along a horizontal plane between first and second positions. The first air opening is on the side of the casing and the second air opening is on the top of the casing and the fan is moved along a vertical plane between first and second positions.

Aspects and embodiments include at least one onboard sensor operatively associated with the controller that collects information from the heat pump water heater system and provides a sensor signal to the controller. The onboard sensor measures at least one of water temperature, ambient temperature, water flow rate into or out of the storage tank, energy consumption, and air flow into and/or out of the heat pump casing, and wherein the controller processes the information to control the heat pump water heater system.

Aspects and embodiments include a communication an interface configured to collect information, the information comprising at least one of electricity time-of-use (TOU) electricity rates, local weather forecasts, local solar forecasts, and grid emissions information, and wherein the controller processes the information to control the heat pump water heater system.

Aspects and embodiments include an interface configured to receive information about a configuration of the heat pump water heater including at least one of its location within a home, which of the at least three air openings are connected to ductwork and where those air openings are ducted to, what type of heating and cooling system is used with the heat pump water heater system, and user preferences for how the heat pump water heater is to operate, and wherein the controller processes the information to control the heat pump water heater system.

Aspects and embodiments include the user preferences may comprise any of that the water heater system is to operate with lowest possible operating costs, that the water heating system is to operate with highest possible efficiency, that the water heating system is to operate to provide highest possible efficiency in the home overall, that the water heater is not to impact the comfort of a particular space to which it is connected by air flow, that the water heating system is to operate with lowest possible greenhouse gas emissions, that the water heating systems is to minimize greenhouse gas emissions of the home overall, that the water heating systems is to operate with the fastest possible heating, and that the water heating system is to balance these user preferences.

In one aspect, a heat pump water heater comprises a heat pump including an evaporator, compressor, condenser, a fan, at least one sensor housed in a casing, and a controller. The casing includes at least three air openings. The controller is configured to actuate one or more of the heat pump components.

Aspects and embodiments include the heat pump casing having at least one damper coupled to at least one opening of the heat pump casing that is actuated by the controller. Aspects and embodiments comprise the heat pump water heater casing having at least one additional fan. Aspects and embodiments comprise the heat pump water heater casing having additional characteristics that facilitate airflow. Aspects and embodiments comprise the heat pump casing having at least one moveable fan. Aspects and embodiments comprise the heat pump casing contains at least one additional fan actuated by the controller. Aspects and embodiments comprise the heat pump casing contains at least one moveable fan actuated by the controller.

In one aspect, a hybrid water heating system comprises a tank configured for storing water, at least one of an electric resistance heating element and/or a heat pump assembly for heating the water in the tank; and a controller operatively coupled to the at least one of an electric resistance heating element and/or a heat pump assembly and which controls operation of the water heating system. The controller includes an interface configured for gathering external information comprising user preferences for the system and at least one of specifications for the building in which the water heating is installed, environmental parameters for the location in which the water heating system is installed, and electrical grid parameters for the location in which the water heating system is installed. The controller is configured to process this information to control the water heater system.

Aspects and embodiments of the information include specifications for the building in which the water heating is installed Aspects and embodiments of the information includes environmental parameters for the location in which the water heating system is installed. Aspects and embodiments of the information include electrical grid parameters for the location in which the water heating system is installed.

Aspects and embodiments of the user preferences comprise any of that the water heater system is to operate with the lowest possible operating costs, that the water heating system is to operate with the highest possible efficiency, that the water heating system is to operate to provide highest possible efficiency in the home overall, that is the water heating system is a heat pump water heater, that the water heater is not to impact the comfort of a particular space to which it is connected by air flow, that the water heating system is to operate with the lowest possible greenhouse gas emissions, that the water heating system is to minimize the greenhouse gas emissions of the home overall, that the water heating systems is to operate with the fastest possible heating, or that the water heating system is to balance these user preferences.

Aspects and embodiments of the specifications for the building which the water heater is installed comprise any of information about the heating system, the cooling system, distributed generation systems, back-up power sources, the presence of intelligent electrical panels, the presence of other smart home controller technologies.

Aspects and embodiments of the controller comprise a set up mode in which any or all of a distributed generation mode, a back-up power supply mode, a minimum GHG content mode, a space heating and cooling mode, and an air inlet and outlet control mode can be activated or deactivated by a user.

Aspects and embodiments of the controller include a user interface comprising a slider bar to request a user's input as to how much to reduce hot water heating while operating in back-up power mode and a radio bar for the user to select one of a plurality of preferences.

Aspects and embodiments of the distributed generation mode comprise receiving Information and processing this information to control the water heater to increase or decrease the coincidence of water heating with a distributed generation system. Aspects and embodiments of the backup power supply mode comprises receiving and processing this information to control the water heater to increase or decrease the coincidence of water heating while the heating system is operating by a back-up power supply. Aspects and embodiments of the minimum GHG content mode comprises receiving Information and processing this information to control the water heater to reduce water heating during times that supplied electricity has carbon content greater than a first threshold and increases water heating during times the electricity is below a second threshold.

Aspects and embodiments of the controller include a user interface comprising a slider bar to request a user's input as to how much to reduce hot water heating while operating in backup power mode and a radio bar for the user to select one of a plurality of preferences. Aspects and embodiments of the controller include a user interface comprising a slider bar to request a user's input as to heating the hot water when carbon emissions from producing electricity is below the second threshold and a radio bar for the user to select one of a plurality of preferences.

Aspects and embodiments include a communication interface configured to collect external information from the internet. Aspects and embodiments include that the controller is further configured to receive data from any of an intelligent electric panel, a distributed generation system, a back-up power source, and wherein the controller processes the information to further control the water heater system. Aspects and embodiments include that the controller is further configured to receive data from any of an intelligent electric panel, a distributed generation system, a back-up power source, that provides information on one or more energy using systems in the home, and uses this information to further control the water heating system.

Aspects and embodiments of the heat pump water heater include a casing enclosing the heat pump system. The casing includes at least two air openings. The system further comprises an interface configured to receive information about the configuration of the heat pump water heater and the at least two air openings. Aspects and embodiments of the information includes at least one of its location within a home, whether any of the air openings are connected to ductwork, whether that ductwork has any openings with actuators and controllable dampers to open and close the openings, and where those multiple air openings are ducted to, what type of heating and cooling system is used with the heat pump water heater system, and user preferences for how the heat pump water heater is to operate. Aspects and embodiments include that the controller processes the information to send a control signal to the dampers in the ductwork or to a responsible user for hand operation of the dampers, and to control the heat pump water heater system.

Aspects and embodiments of the heat pump water heater include a casing enclosing the heat pump system. The casing includes at least three air openings for receiving air through at least a first air opening and exhausting air through at least a second air opening. The system further comprises at least one controllable damper and actuator within the casing. The damper is coupled to at least one of the air openings such that its position is movable and controls airflow through the at least one opening. The system further comprises an interface configured to receive information about a configuration of the heat pump water heater and the at least three air openings. Aspects and embodiments of the heat pump water heater include a casing enclosing the heat pump system. The information includes at least one of its location within a home, which of the at least three air openings are connected to ductwork and where those air openings are ducted to, what type of heating and cooling system is used with the heat pump water heater system, and user preferences for how the heat pump water heater is to operate. The controller processes the information to send control signal the actuator to control the position of the damper, and also controls the heat pump water heater system.

Aspects and embodiments of include at least one of a temperature sensor inside the casing that measures the air temperature from the different air openings for receiving air. The temperature sensor in communication with the controller and the controller processes the information to control the heat pump water heater system.

Aspects and embodiments of include the controller estimates the temperature from air coming from different air openings based on sensors in the water heating system, including at least one of a temperature sensor in the tank, electrical consumption of the compressor, and the temperature of the refrigerant returning from the compressor, and the controller processes the information to control the heat pump water heater system.

In one aspect, a hybrid water heating system comprises a water tank including at least one heating element for heating water stored in the water tank, a heat pump system, a casing enclosing the heat pump system, and a controller. The heat pump system is coupled to the water tank for heating and/or maintaining a temperature of water in the water tank. The heat pump system is disposed in an enclosed in a casing providing an enclosed space proximate the water tank. The casing including at least three air openings for receiving air through at least a first air opening and exhausting air through at least a second air opening. The controller is operatively coupled to the heating element and the heat pump system for controlling operation of the hybrid water heating system.

Aspects and embodiments include at least one electro-mechanical sealing device configured to enable and prevent airflow through at least one of the at least three air openings. Aspects and embodiments include four air openings comprising two air inlets and two air outlets. Aspects and embodiments include four electro-mechanical sealing devices each coupled to a respective air inlet or air outlet. Aspects and embodiments include each electro-mechanical sealing device including a damper coupled to an actuator that is operatively coupled to the controller. Aspects and embodiments include the controller is configured to control the actuator so as to move the damper between a first position covering the respective air opening and a second position at least partially uncovering the respective air opening. Aspects and embodiments include each electro-mechanical sealing device comprising louvres coupled to an actuator that is operatively coupled to the controller. Aspects and embodiments include the controller is configured to control the louvres to rotate between a first position covering the respective air opening and a second position at least partially uncovering the respective air opening.

Aspects and embodiments include the casing comprising at least one air inlet and two air outlets. Aspects and embodiments include at least one fan configured to move air through the casing between the at least one air inlet and the at least two air outlets. Aspects and embodiments include respective first and second fans operatively coupled to the controller and configured for venting air out of the first and second air outlets. Aspects and embodiments include first and second electro-mechanical sealing device operatively coupled to the controller and configured to enable and prevent airflow through the first and second air outlets. Aspects and embodiments include a fan that is operatively coupled to the controller and an actuator operatively coupled to the controller and configured to move the fan between first and second positions for venting air out of the respective first and second air outlets. Aspects and embodiments include first and second electro-mechanical sealing devices operatively coupled to the controller and configured to enable and prevent airflow through the first and second air outlets. Aspects and embodiments include that the first and second air openings are on the side of the casing and the fan is moved horizontally between first and second positions. Aspects and embodiments include that the first air opening is on the side of the casing and the second air opening is on the top of the casing and the fan is moved vertically between first and second positions. Aspects and embodiments include that at least one onboard sensor operatively associated with the controller that collects information from the hybrid water heater system and provides a sensor signal to the controller. Aspects and embodiments include that the onboard sensor measures at least one of water temperature, ambient temperature, water flow rate into or out of the storage tank, energy consumption, and air flow into and/or out of the heat pump casing, and the controller processes the information to control the hybrid water heater system.

Aspects and embodiments include a communication interface configured to collect information comprising at least one of electricity time-of-use (TOU) electricity rates, local weather forecasts, local solar forecasts, and grid emissions information. Aspects and embodiments include that the controller processes the information to control the hybrid water heater system.

Aspects and embodiments include an interface configured to receive information about a configuration of the hybrid water heater including at least one of its location within a home, which of the at least three air openings are connected to ductwork and where those air openings are ducted to, what type of heating and cooling system is used with the hybrid water heater system, and user preferences for how the heat pump water heater is to operate. Aspects and embodiments include the controller processes the information to control the hybrid water heater system.

Aspects and embodiments include that the user preferences may comprise any of that the heat pump water heater is to operate with the lowest possible operating costs, that the heat pump water heater operates with the highest possible efficiency, and that they prefer the heat pump water heater operates with the fastest possible heating.

Aspects and embodiments include that the heat pump water heating includes an evaporator that receives warm air, that provides warm air to a refrigerant within the evaporator and that expels cooled air from the refrigerant. Aspects and embodiments include a compressor coupled to the evaporator that receives the refrigerant and compresses and further warms the refrigerant. Aspects and embodiments include a condenser coil being coupled to the water and the condenser coil being connected to the compressor and to the evaporator, the condenser coil receives the warmed refrigerant, transfers heat to the water and provides cooled refrigerant to the evaporator.

Aspects and embodiments include a sensor operatively associated with the controller including at least one of a temperature sensor and an airflow sensor.

In one aspect, a hybrid water heating system comprises a tank configured for storing water and including at least one heating element for heating water stored in the water tank, a heat pump system coupled to the tank for heating and/or maintaining a temperature of water in the tank, the heat pump system being disposed in an enclosed space proximate the tank, a casing enclosing the heat pump system to provide the enclosed space, the casing including at least two air openings for receiving air through at least a first air opening and exhausting air through at least a second air opening, at least one moveable structure coupled to an exterior of the casing enclosing the heat pump system, and a controller. The at least one movable structure contains at least two openings and is configured and arranged to be moved between a first position not over at least one of the at least two air openings to a second position over at least one of the at least two air openings in the casing for receiving or exhausting air with the at least two openings of the at least one movable structure. The controller is operatively coupled to the heating element and the heat pump system for controlling an operation of the heat pump water heating system.

Aspects and embodiments include an actuator coupled to the at least one moveable structure and wherein the controller is operatively coupled to the actuator and is further configured to control the actuator to move the at least one moveable structure between the first position and the second position.

Aspects and embodiments include that the at least two air openings are on the side of the casing.

Aspects and embodiments include that the controller comprises a communication interface configured for gathering information comprising at least one of user preferences for the system, specifications for energy-related systems of a home in which the water heating system is installed, specifications for how the water heating system is physically configured within the home, environmental parameters for a location in which the water heating system is installed, greenhouse gas intensity for a location in which the water heating system is installed, and information regarding electrical blackouts for a location in which the water heating system is installed, and wherein the controller processes the information to control the heat pump water heater system.

Aspects and embodiments include that the information about the specification for the energy-related systems of the home comprises any of information about a heating system, a cooling system, distributed generation systems, back-up power sources, presence of intelligent electrical panels, and presence of other smart home controller technologies, and wherein the controller processes the information to control the heat pump water heater system.

Aspects and embodiments include that the information about the specifications for how the water heating system is physically configured within the home comprises at least one of its location within a home, which of the at least two air openings are connected to ductwork and where such air openings are ducted to, what type of heating and cooling system is used in the home, and user preferences for how the heat pump water heater is to operate, and wherein the controller processes the information to control the heat pump water heater system.

Aspects and embodiments include that the information about the user preferences includes any of that the water heater system is to operate with lowest possible operating costs, that the water heating system is to operate with highest possible efficiency, that the water heating system is to operate to provide highest possible efficiency in the home overall, that the water heater is not to impact the comfort of a particular space to which it is connected by air flow, that the water heating system is to operate with lowest possible greenhouse gas emissions, that the water heating systems is to minimize greenhouse gas emissions of the home overall, that the water heating systems is to operate with the fastest possible heating, and that the water heating system is to balance these user preferences, and wherein the controller processes the information to control the heat pump water heater system. Aspects and embodiments include the user preferences do not comprise selection of predefined operating modes for a heat pump water heater.

Aspects and embodiments include that the controller comprises a set up mode that includes at least one of a plurality of operating modes including distributed generation mode, a backup power supply mode, a minimum GHG content mode, a space heating and cooling mode, and an air inlet and outlet control mode can be activated or deactivated by a user.

Aspects and embodiments include that the controller is configured to allow the user to enable or disable at least one mode of the plurality of operating modes.

Aspects and embodiments include that the distributed generation mode comprises receiving ay of utility rate information; weather forecast information; wind generation production forecast information; solar system production forecast information; voltage information; and distributed generation system information from the distributed generation system or from a smart electrical panel, and a smart home controller or equivalent; and processing this information to control the water heater to increase or decrease the coincidence of water heating with a distributed generation system.

Aspects and embodiments include that the backup power supply mode comprises receiving any of back-up power supply information directly from the back-up power supply system or from a user, a smart electrical panel, a smart home controller, a voltage sensor, and an outage duration analysis; and processing this information to control the water heater to increase or decrease energy consumption of water heating while the heating system is operating by a back-up power supply.

Aspects and embodiments include that the minimum greenhouse gas minimization mode comprises receiving any of information regarding current greenhouse gas intensity or upcoming greenhouse gas intensity of local electricity and processing this information to control the water heater to reduces water heating during times that supplied electricity has carbon content greater than a first threshold and increases water heating during times the electricity is below a second threshold.

Aspects and embodiments include that the heating and cooling system integration mode comprises receiving any of a weather forecast and space heating and cooling system information from any of the space heating and cooling system, a smart electrical panel, and a smart home controller; and processing this information to decrease energy consumption of water heating when desuperheating heat is provided.

Aspects and embodiments include that the inlet outlet control mode comprises receiving any of information about the space heating and cooling systems, information about ducting configuration, information about user preference settings, a weather forecast, and space heating and cooling system operational information from any of space heating and cooling system, a smart electrical panel, and a smart home controller, and processing this information to alter the ducting configuration to optimize performance according to user preferences.

Aspects and embodiments include at least one sealing device configured to enable and prevent airflow through at least one of the at least two air openings.

Aspects and embodiments include that the at least one sealing device includes a damper coupled to an actuator that is operatively coupled to the controller, and wherein the controller is configured to control the actuator so as to move the damper between a first position covering the respective air opening and a second position at least partially uncovering the respective air opening.

Aspects and embodiments include that the at least one sealing device includes louvres coupled to an actuator that is operatively coupled to the controller, and wherein the controller is configured to control the louvres to rotate between a first position covering the respective air opening and a second position at least partially uncovering the respective air opening.

Aspects and embodiments include that the at least one sealing device includes first and second sealing devices operatively coupled to the controller and configured to enable and prevent airflow through the at least two air openings.

Aspects and embodiments include that the casing includes at least one fan operatively coupled to the controller for venting air out of one of the at least two air openings.

It is to be appreciated that one or more embodiments described in the Specification and/or recited in the claims may not be included in this section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIG. 13A-D illustrate top down and perspective views of an embodiment of a heat pump casing with multiple air inlets;

FIG. 14A-D illustrate top down and perspective views of another embodiment of a heat pump casing with multiple air inlets;

FIG. 16A-B illustrate a top down view of an embodiment of heat pump water heater system with a fan rotating about a fixed axis;

FIG. 17A-B illustrate a top down view of an embodiment of heat pump water heater system with a fan that moves along a track;

DETAILED DESCRIPTION

Figure 1:
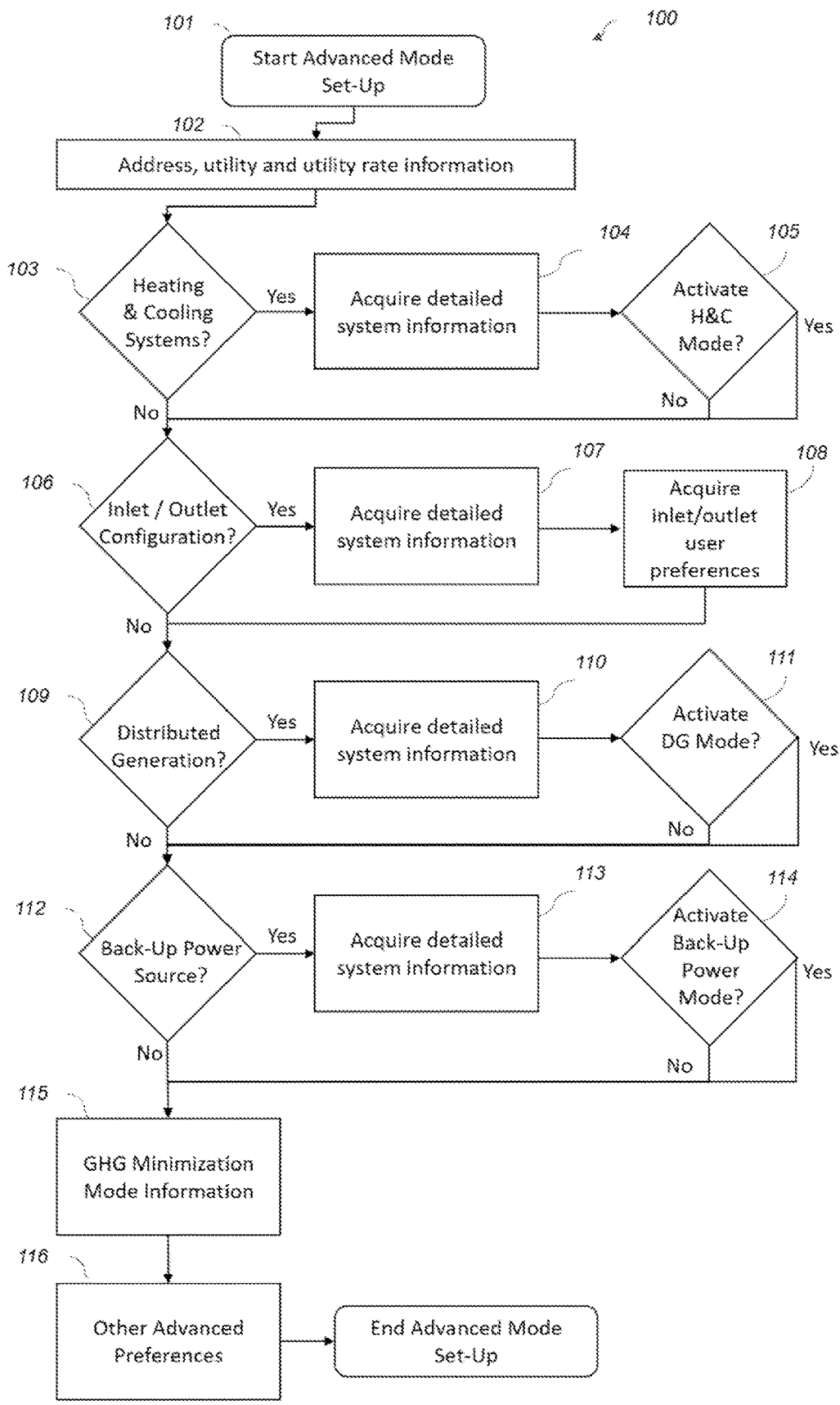
FIG. 1 is a flow chart illustrating one embodiment of a method for the acquisition of customer information to support a plurality of operational modes during hot water set-up of operation of a hybrid water heater system.

The phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the aspects and embodiments, it will be understood that a number of techniques and steps are disclosed. Each of these has individual benefits and each can also be used in conjunction with one or more, in some cases all, of the other disclosed techniques. Accordingly, for the sake of clarity, this description shall refrain from repeating every possible combination of the individual steps and elements of the invention in an unnecessary fashion. Nevertheless, the specification and claims should be read with the understanding that other such combinations are entirely within the scope of the disclosure and the claims.

Residential energy systems are becoming increasingly complex and electrified. In addition, residential occupants may have different preferences for managing their home energy systems, such as maximizing comfort, minimizing annual costs, minimizing greenhouse gas emissions, and more.

Renewable power generation is available and increasingly common at the individual building level, known as "behind the meter" or "distributed" generation (e.g. a home with rooftop solar). Distributed generation (e.g. a home with rooftop solar) does not always match the power demand of the building (e.g. home, business, factory, institution, etc.) it serves. When generation exceeds demand, excess power is exported to the grid and when generation is less than demand, power is imported from the grid. The compensation customers receive for power exported to the grid may be great, equal, or less than their price of electricity, and their economic incentives for consuming the power generated behind the meter vary as a result.

A growing number of residences have at least one of a smart electrical panel, a communication-enabled inverter, a smart home controller, a whole home energy monitor, or a smart energy management system. These devices have the capacity to share information about other energy using systems in the home, including the amount of energy being drawn at a given moment in time. For example, this information may be shared via Wi-Fi, Bluetooth or other industry standard communication protocols.

Some residences have a back-up power source, for instance fossil-fuel powered generators or batteries. Back-up power sources have limited energy to provide to the home before being resupplied. Some back-up power sources, particularly batteries, may be used for revenue generation through participation in various energy markets.

Water heating is the second largest use of energy in a typical American home, after space conditioning, and accounts for about 18% of domestic energy usage. Electric water heaters use one or more heating elements, generally but not exclusively electric resistance elements, to heat water. Another kind of water heater is a heat pump water heater, which heats water by using a heat pump subassembly that draws heat from a source, usually air in a residential application, which is in direct contact with the evaporator of the heat pump subassembly. The evaporator contains coils housing refrigerant which absorbs this latent heat from the air. The heat is ultimately transferred into the storage tank via a condenser, which is often (but not always) wrapped around the outside of the storage tank, and through which the aforementioned refrigerant flows. Heat pump water heaters typically have one or more electric heating elements contained within the storage tank that can also heat the water, although they may also have no electric heating element at all. Heat pump water heaters operate with higher efficiency and thus generally have lower annual costs when compared with other traditional water heaters like electric water heaters and gas water heaters; they are also fully electric and thus have no direct GHG emissions unlike gas water heaters.

Water heaters are generally installed inside the building envelope (where the building envelope may be a home, apartment, or other dwelling) and are usually installed in either conditioned or unconditioned spaces. Water heaters may be installed outside the building envelope in certain climates. Here, a conditioned space is one that is thermally coupled to an heating, ventilation and cooling (HVAC) system (or something comparable) which can provide heating and/or cooling, while an unconditioned space is not thermally coupled to such a system. Some HVAC systems can provide excess heat to a water heater through a heat exchanger known as a desuperheater. Heat pump water heaters may be installed to draw air in from and return air to the space immediately around them or heat pump water heaters may be installed with ducting to draw air from and return air to spaces that are not immediately around them.

Heat pump water heaters expel cooled and dehumidified air which has passed through the evaporator. This cooling and dehumidifying effect may be beneficial or detrimental. As an example, the cooling and dehumidification effect provided by a heat pump water heater may provide a reduction in air conditioning expense if the unit utilizes air from the conditioned space of the home. The same cooling and dehumidification effect may also increase heating expense if the unit utilizes air from the conditioned space of the home. Additionally, the same cooling effect may be viewed negatively by building occupants in the winter, particularly in colder climates, as it may make the space from which the heat pump water heater draws air uncomfortable.

The coefficient of performance (COP) of a heat pump water heater, a measurement of overall system efficiency, increases as the air source temperature increases. Heat pump water heaters currently utilize only one air source, often the ambient environment around the water heater, and therefore the COP can fluctuate based on the season or other environmental factors as the air source temperature rises and falls.

It would be advantageous for a water heater to have modes that optimize its operation in relation to the user preferences of the building occupant(s), the operation of other energy systems in the home, and various other pieces of external information. This objective can be further accomplished if a water heater is a heat pump water heater that can be coupled to multiple air sources and/or sinks, and that has the ability to select between these multiple air sources and/or sinks so as to always use the air source and/or sink that provides the most beneficial performance characteristics. Ultimately, a water heater with such capabilities could provide any or all of energy savings, operational cost reductions, comfort benefits, reduced GHG emissions and/or some combination thereof.

A method and system for controlling a water heater system is disclosed. Aspects and embodiments of the method and system include enabling, activating, and deactivating advanced water heater operating modes is disclosed herein. In the following description, for purposes of explanation, numerous specific examples are set forth in order to provide a thorough understanding of the present disclosure. It will be evident to one skilled in the art that the present disclosure may be practiced without these specific details. It is understood that the disclosed modes of operation do not preclude other modes of operation, whether cited in the prior art or not, from also being enabled, activated and deactivated on electric water heaters. Indeed, the Advanced Modes disclosed in this disclosure may operate concurrently with other modes. This includes but is not limited to modes such as Electric Mode (only heating elements are used), Heat Pump Mode (only heat pump is used), High Demand (both heating elements and heat pump are used, with robust heating element usage), Energy Saver (both heating elements and heat pump are used, with light heating element usage), and Vacation Mode (temperature setpoint is low, such as 55 or 60° F., while some water heaters may heat up on a set schedule to eliminate bacteria growth).

The present disclosure is intended to be considered an exemplification of the method and system of controlling a water heater system including enabling, activating, and deactivating advanced water heater operating modes, and is not intended to limit the invention to the specific embodiments illustrated by the figures or descriptions below.

The present disclosure comprises of a method for gathering information about user preferences, gathering information about other energy systems in the building in which the water heating system is installed, identifying whether one or more of the modes should be activated for a given water heater installation at a given moment in time, a method for activating each of the modes based on user inputs and/or information external to the water heater, and a method for deactivating each of these modes. These advanced water heater operating modes include a Distributed Generation Mode, Back-Up Power Source Mode, GHG Minimization Mode, Space Heating/Cooling System Integration Mode, and Air Inlet/Outlet Control Mode. It is appreciated that the consumer-facing names of these modes may be different than described, i.e. for marketing or communication purposes. It is also appreciated that according to aspects and embodiments of the system and methods disclosed herein, whenever possible the water heater can be configured to operate in the appropriate mode or modes without human intervention, as doing so will result in greater optimization of the desired outcomes with and less inconvenience.

The present disclosure operates on an electric resistance water heater and/or a heat pump water heater, the latter sometimes being referred to as a "hybrid" water heater and can be embodied, for example, in an internet-enabled software application residing on the water heater and which is also communicatively coupled to a cloud-based software infrastructure (i.e. "The Internet of Things" or IoT). It is appreciated that the aspects of the present disclosure could also be implemented on other types of water heaters e.g. gas water heaters, tankless water heaters, and others. In some embodiments, the method and system also include integrations with third party data sources, integrations to other devices and systems at the customer location, and/or external sensors. The water heater referred to herein is understood to be a standalone unit that can be purchased and installed within or immediately adjacent to a building, connected to the internet at least via the system and methods disclosed herein, plumbed to a cold water supply and a hot water distribution system which provides water to various outlets within the building such as shower heads, sinks, and baths. According to aspects and embodiments, one or more users are able to communicate with the water heater via any or all of, for example, a control panel on the water heater or a software application downloaded to their phone, tablet, computer or other similar device. If the water heater is a heat pump water heater, a suitable air source and air sink are understood to be provided. Those with ordinary skill in the art to which this disclosure belongs will understand that other components which provide the same respective functions as control panels, internet connections, plumbing, internet-enabled software applications, etc. may also be used with the methods and systems of the present disclosure.

FIG. 1 illustrates one embodiment of a process 100 that requests information relevant to each of a plurality of possible advanced operating modes of the water heating system. The process can be, for example, provided by a controller on the water heating system and/or an application running on a processor (hereinafter "controller"). The controller can be an internet enabled controller. The controller may be enabled to provide information, for example, at a control panel of the controller at the water heater itself or, for example, via an application that can be downloaded via the internet to, for example, a phone, tablet, laptop or other similar device that can communicate with the controller for example via a Wi-Fi or Bluetooth connection. The internet enabled controller manages the water heater. Set-up of the controller, including but not limited to the advanced modes set-up 101, may be conducted by the homeowner, the installer and/or another responsible party (the "set-up user"), and individualized set-up experiences of each party may also be combined to provide the information received by the controller. For example, the installer may be knowledgeable about the home heating system and provide relevant information to the controller on the energy system. The homeowner could have specialized knowledge about user preferences and provide this information to the controller. It is appreciated that the order in which the information is acquired is not necessarily a critical aspect of the disclosure and that the information can be acquired in a natural order of operation. However, there may be certain information or steps that are advantageously done in a certain order and are considered to be part of the aspects and embodiments of the disclosure. Thus, the order illustrated in FIG. 1 is but one embodiment of the disclosure. The controller can acquire the information through standard software user experience elements such as pull-down menus, radio buttons, text boxes, check boxes, etc. The advanced modes identified herein may be activated and deactivated with binary or non-binary questions, opt-in or opt-out. According to aspects and embodiments, to support all advanced operating modes, the controller acquires the address (as shown in 102) at which the water heater is installed. At a minimum this address comprises the street address, city, state, and zip code but can also include additional information. The controller uses address information to suggest and/or determine the electric utility which serves the home or business, preferentially by suggesting the most likely option(s), or by providing a pull-down menu or equivalent user experience element. The controller also uses the address information to suggest and/or determine the user's utility rate 102 where applicable, preferentially by suggesting the most likely option(s), or by providing a pull-down menu or equivalent user experience element. The rate information may be sourced from a third-party solution such as Gridx (www.Gridx.com), the U.S. Utility Rate Database (https://cmr.earthdata.nasa.gov/search/concepts/C1214603845-SCIOPS), or the Open EI Utility Rate Database (https://openei.org/wiki/Utility_Rate_Database). As the majority of customers do not know their rate, the controller may show the set-up user a picture of the customer's bill, with the location of the rate code highlighted. If the customer's energy is provided by a retail electric provider, then the controller may acquire information comprising the name of the retail electric provider, the name of the electric plan (also known as electric rate), a copy of the bill, or other identifying information. If utility information has been acquired to support other modes, such as "time-of-use" (TOU) rate or grid interactive programs, then the controller shall skip the acquisition utility and rate information.

The controller requests information on the heating and cooling systems of the home 103. If the user responds that there are heating and/or cooling systems in the home 103 YES then the controller acquires, at step 104 detailed information on the heating and cooling systems comprising the heating fuel type (electricity, natural gas, oil, propane, etc.), the heating system type (furnace, boiler, electric resistance, air source electric heat pump, ground source electric heat pump, etc.) and the cooling system type (central AC, window AC, mini-splits, etc.). The controller also acquires information comprising whether excess thermal energy from the heating and cooling system is used to heat water for the water heater. If excess thermal energy from the HVAC system is being used to heat water for the water heater, then the controller next acquires information comprising whether the user prefers to alter water heating to increase overall water heating efficiency 105. If the user responds affirmatively 105 YES, then the heating and cooling system integration mode is activated, and the controller proceeds on to the next question. If the user responds negatively 105 NO, heating and cooling system integration mode is not activated and the controller proceeds on to the next question. If excess HVAC energy is not being utilized, the mode is not activated. Having gathered this information, or if the user responds that there are no heating and cooling systems in the home 103 NO then the controller proceeds on to the next question.

Referring again to FIG. 1, in this embodiment the water heater is a heat pump water heater and the controller proceeds on to questions pertaining to inlet and outlet configuration 106. If the user responds that the heat pump water heater is thermally coupled to more than one space 106 YES then the controller acquires, at step 107 detailed information on the configuration. If the heat pump water heater contains multiple controllable inlets and outlets, then the controller acquires information comprising to which space each of these inlets and outlets are thermally coupled. If the heat pump water heater is connected to ducting which is then thermally coupled to multiple inlets and outlets, the controller acquires information comprising to which space each of these inlets and outlets are thermally coupled and information comprising the how the controller may effect changes to the configuration of these inlets and outlets, options for which comprise manual communication to a user, communication to actuators via Bluetooth, Wi-Fi or other established protocol, or other methods familiar to those with ordinary skill in the art to which this invention belongs. If the heat pump water heater is thermally coupled to more than one space, then the controller next acquires information comprising user preferences for prioritization 108, including the comparative prioritization of user comfort in thermal spaces to which the water heater is coupled, overall efficiency of the home, efficiency of the heat pump water heater, and/or minimization of greenhouse gas emissions. Having acquired this information, or if the user responds that the heat pump water heater is thermally coupled to only one space 106 NO the controller proceeds on to the next question.

Referring again to FIG. 1, the controller next acquires information on distributed generation 109. If the user responds that the home has a distributed generation system 109 YES then the controller acquires, at step 110, information on the distributed generation systems co-located with the water heater. The detailed system information 110 acquired by the controller varies by distributed generation technology. For solar systems, the controller acquires information comprising any or all of system size (e.g. kW) and the orientation of the system (north, south, east, west or a combination thereof). For wind systems, the controller acquires information comprising any or all of system size (e.g. kW) and unit height (e.g. feet or meters). For hydro systems, the controller acquires information comprising any or all of system size (e.g. kW) and the name of the body of water on which the system is located, if this information is available. The controller next acquires information comprising whether the user prefers to activate the water heater's distributed generation mode 111, in which water heating is made more or less coincident with the distributed generation. Having gathered this information, or if the user responds that the home does not have a distributed generation system 109 NO the controller proceeds on to the next question.

Figure 2:
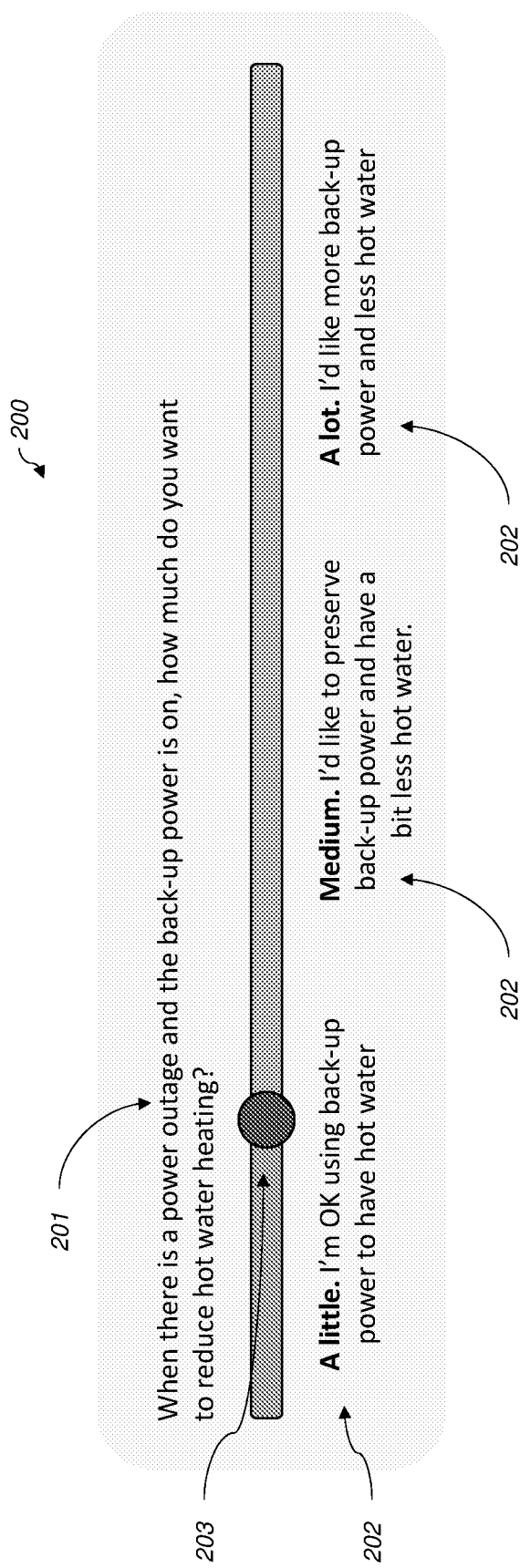
FIG. 2 is a representative user experience element, a slider bar, for the acquisition of customer preferences regarding back-up power source mode.

Referring again to FIG. 1, the controller next requests information on Back-Up Power Sources 112. If the user responds that there is a back-up power source 112 YES, the controller acquires detailed system information on the back-up generator and/or energy storage system at 113. The controller can acquire information comprising the type of technology (e.g. generator, battery, fuel cell, etc.), the capacity (e.g. kW) of the back-up power source, and whether the start-up of the back-up power source is instantaneous (i.e. there is no interruption in power to the location). For batteries, the controller can acquire information comprising the energy storage of the system (e.g. kWh), how the battery is used (e.g. during power outages, peak shaving, etc.). For generators and fuel cells, the controller can acquire information comprising the fuel source (e.g. gasoline, diesel, propane, natural gas, kerosene, etc. for generators; natural gas, hydrogen, methanol, ammonia, etc. for fuel cells) and, with the exception of natural gas, the amount of available storage (e.g. gallons, pounds or other appropriate units for a given fuel). For natural gas, the controller may confirm that the back-up generator is connected to a distributed system and thus has unlimited supply, or this may be assumed. Optionally, the controller may acquire information on the make and model of the generator itself or present the set-up user with a list of makes and models from which to choose. The controller next acquires information comprising whether the user prefers to activate the water heater's back-up power mode 114, in which water heating is modified to maximize the energy available from the back-up power supply. FIG. 2 illustrates one embodiment of a possible user element presented to a user for the controller to acquire this information, via a slider bar 200. The slider bar includes a question 201 to solicit a user response, calibrating statements 202 to guide the user response, and a radio bar 203 along which the user slides the circle to provide their response. The controller can also solicit whether the set-up user wishes to receive inquiries regarding whether the power outage is over and, if so, via what means of communication and on what schedule. Having gathered this information or if the user responds that the home does not have a distribution generation system 112 NO, the controller proceeds on to the next step.

Figure 3:
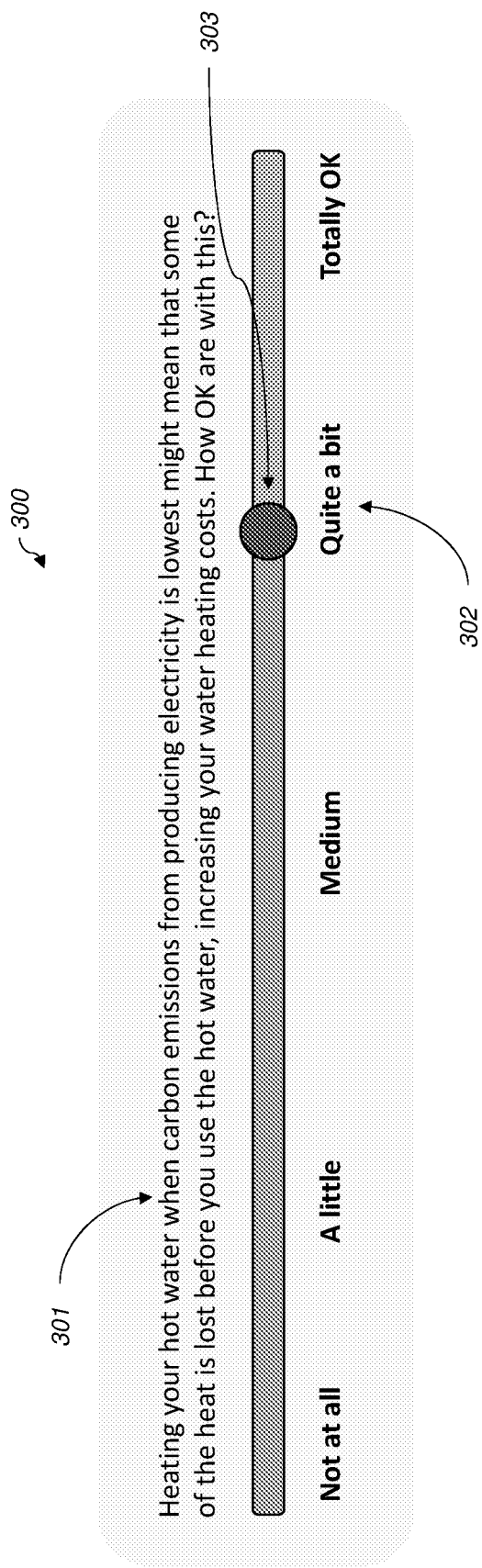
FIG. 3 is a representative user experience element, a slider bar, for the acquisition of customer preferences regarding reducing GHG emissions.

Referring again to FIG. 1, the controller next acquires information comprising whether or to what extent the user prefers to activate GHG minimization mode 115. Operating a water heater in GHG Minimization Mode may increase heat lost from the water to the ambient environment ("standby losses"). Therefore, the controller may acquire information on this mode with a non-binary question. FIG. 3 illustrates one embodiment of a possible user element for the controller to acquire this information, via a slider bar 300. The slider bar includes a question 301 to solicit a user response, calibrating statements 302 to guide the user response, and a radio bar 303 along which the user slides the circle to provide their response. In a different embodiment, the controller may provide the responsible user with quantitative estimates of the additional heating cost incurred for each ton of CO2 emissions avoided.

Referring again to FIG. 1, the controller next acquires other information that supports the advanced modes 116, such as information necessary to integrate with a smart home communication system such as Amazon Alexa, Apple Siri, or Google Home).

Having completed the acquisition of information during the set-up process 100, other steps of the set-up process will now resume, and the Advanced Mode Set-Up is considered complete 117.

After set-up 100 and during normal operation, a user may update the information related to the advanced modes. In one embodiment, this update is carried out by accessing a user profile and changing the appropriate settings, for example, the breadcrumbs for accessing the settings for Distributed Generation Mode might be "Home>Settings>Operating Modes>Distributed Generation", and the breadcrumbs for accessing the settings for Back-Up Power Source might be "Home>Settings>Operating Modes>Back-Up Power Source".

The respective advanced modes of operation are activated, operated, and de-activated, with the controller executing these steps for each operating mode. Activation, deactivation and operation may be binary or non-binary.

Figure 4:
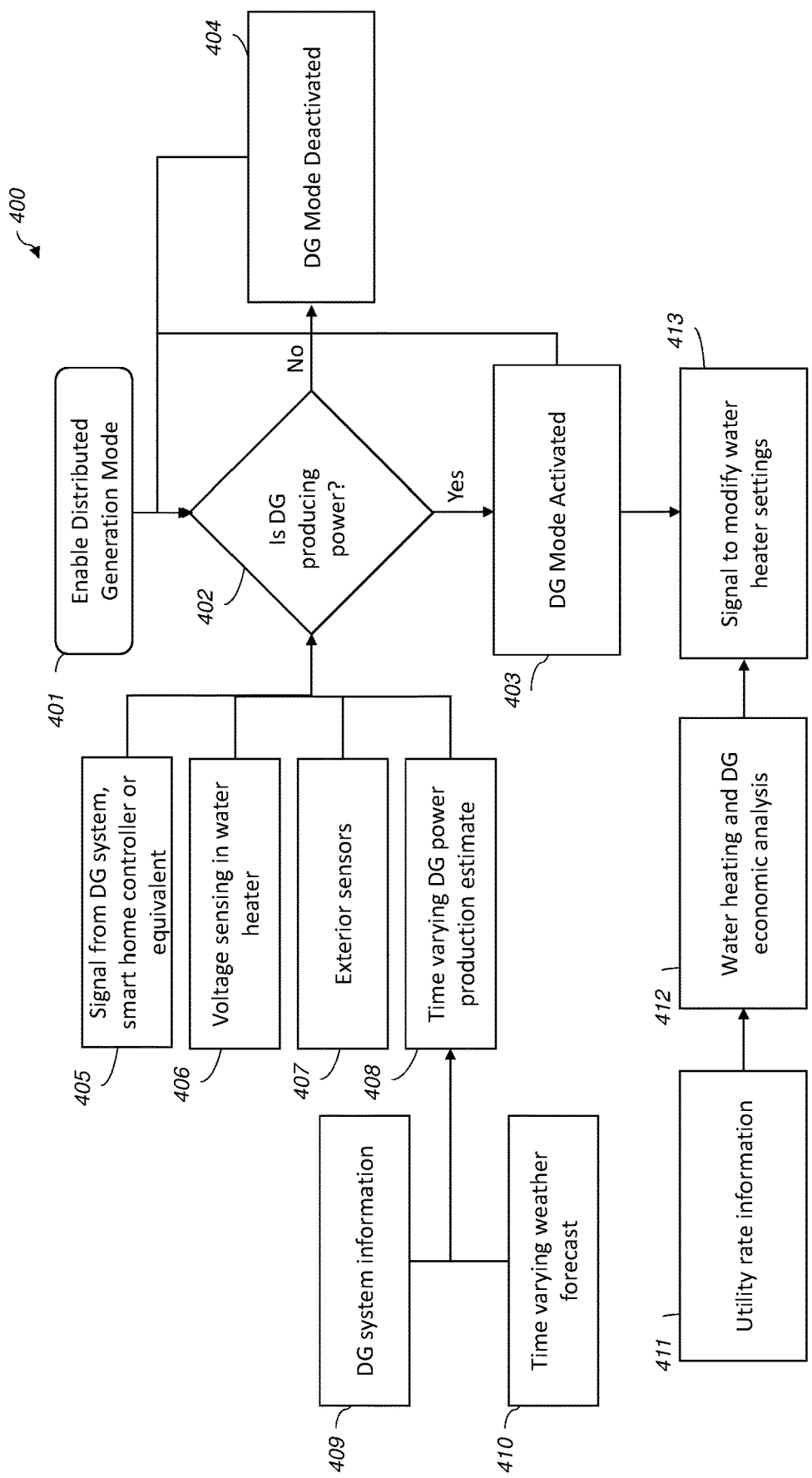
FIG. 4 is a flow chart illustrating one embodiment of a method for activation, operation and deactivation of a distributed generation mode of operation of a hybrid water heater system.

FIG. 4 illustrates an example of a method of operation of Distributed Generation (DG) Mode. According to aspects and embodiments. If the Distributed Generation Mode is enabled 401, the controller can regularly evaluate whether the Distributed Generation System is producing electricity above a given threshold 402. This threshold may optionally be set by the set-up user or by an entity managing overall performance of the advanced functions, such as the water heater manufacturer. If the controller determines that the DG system is producing electricity 402 Yes, then DG Mode is activated 403; otherwise 402 NO, DG mode is deactivated 404. According to aspects and embodiments, one or more sources of data may be used by the controller to determine if the DG system is producing electricity. According to aspects and embodiments, the DG system comprises a smart home controller, a smart panel box, or other intelligent onsite device that provides information comprising DG power production. The DG power production information can be provided 405 through Wi-Fi, Bluetooth and/or any other established communications protocols. According to aspects and embodiments, the DG system's power output alters the onsite voltage sufficiently for the water heater to directly sense 406 that the DG system is operational. According to aspects and embodiments, exterior sensors, such as one or more solar cells with communications capability, are provided with the water heater and co-located with the distributed generation system to sense insolation 407 and provide a direct signal to the water heater management application. According to aspects and embodiments, software, for example cloud-based software in communication with the water heater provides a time-varying estimate 408 of DG system power production on a regular basis (e.g. daily), by using location data, details of the DG system 409, and commercially available, location-specific weather forecast data 410. Alternatively, such a forecast may be obtained via software integration with third party solutions specializing in this analysis, such as SteadySun or other companies. Those with ordinary skill in the art to which this invention belongs will recognize the commonality of a time-varying, location specific power production forecasts or solutions.

According to aspects and embodiments, the controller can determine directionality of the Distributed Generation Mode by using the previously acquired rate information 411 to conduct an economic analysis 412. For instance, if the feed-in tariff for DG power production exceeds the cost of power to the customer, then hot water heating would be minimized during times of DG power production to maximize the customer benefit. As an example, if a customer pays $0.10 per kWh for electricity (the "retail price"), receives compensation of $0.12 per kWh (the "wholesale price") for exporting this power to the grid, and shifts 2,000 kWh per year of water heating to times when the DG system is NOT producing power, they receive an economic benefit of $40.00 per year (i.e. they pay $200 for the electricity they use at retail price, but receive $240 in economic benefit for the DG power they've exported to the grid). In this example, the directionality of Distributed Generation Mode is "negative": it's more advantageous for the customer NOT to use DG because the economic benefit for exporting power to the grid is greater than the retail price. As an alternate example, if a customer pays $0.10 retail price per kWh for electricity but receives wholesale price compensation of $0.04 per kWh for power exported to the grid, then shifting 2,000 kWh per year of water heating time to when the DG system IS operating provides an economic benefit of $120.00 per year (i.e. the customer saves $200 by shifting to the DG system instead of paying retail price, but misses out on $80 of credit that would have been provided by exporting this power to the grid). In this case, the directionality of Distribution Generation Mode is "positive": it's more advantageous for the customer to use DG because the economic benefit for exporting power to the grid is less than the retail price. Thus, the controller as a result of operating in DG Mode can send a signal to increase or decrease the coincidence of water heating 413 with DG system production depending on the economic conditions of a given site.

The specific methods for modifying the operation of the water heating may be simple or sophisticated. Typical water heater control algorithms are based upon the temperature in the tank, and work by activating one or more of the heating technologies when the measured temperature(s) are lower than the temperature setpoint. Therefore, one method by which the controller may modify the water heating pattern is to modify temperature setpoints. Aspects and embodiments of the controller could be implemented, for example, as "if distributed generation is on, then add directionality multiplied by five degrees Fahrenheit to the temperature setpoint." The directionality would be a value of 1 or -1, depending on whether it is advantageous to increase or decrease the coincidence of water heating and solar energy production. Temperature setpoints may also be increased or decreased during periods of non-DG production in order to modify water heating during these periods. In one embodiment, the logical structure of the controller may be "if distributed generation is off, then add directionality multiplied by negative one multiplied by five degrees Fahrenheit to the temperature setpoint." Electric resistance water heaters generally have two resistive heating elements. Heat pump water heaters have a heat pump and generally include at least one resistive heating element, although this is not a strict requirement. Thus, the technologies available for modification vary by water heater type and implementation of the controller will vary accordingly. A water heater may also be controlled by other types of control algorithms, such as predictive control algorithms. Aspects and embodiments of the Distributed Generation Mode could be implemented with a predictive control algorithm by incorporating the directionality and a prediction of when distributed generation production will occur.

Figure 5:
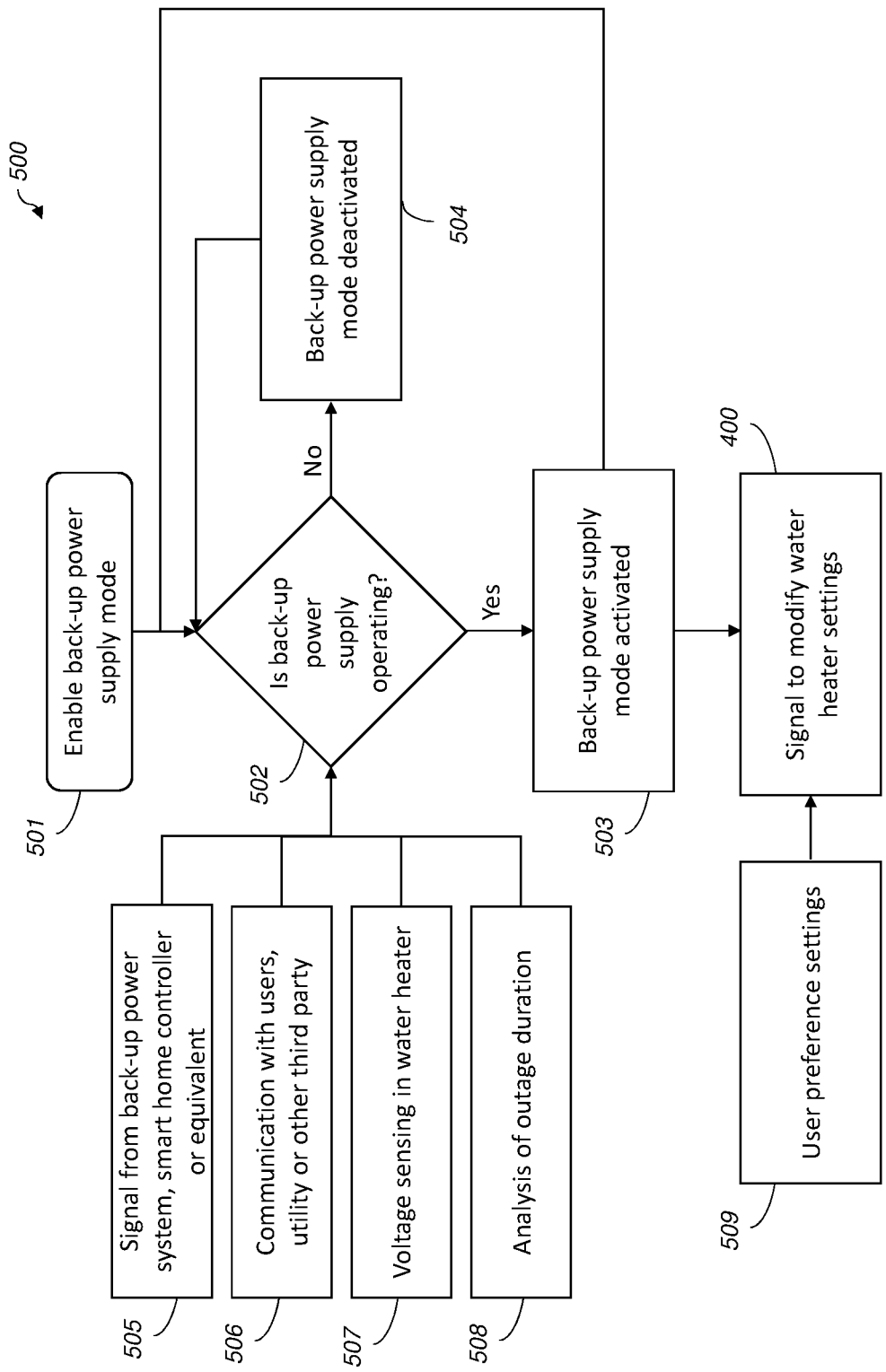
FIG. 5 is a flow chart illustrating one embodiment of a method for activation, operation and deactivation of a back-up power supply mode of operation of a hybrid water heater system.

FIG. 5 illustrates an example of a method of operation for Back-Up Power Source Mode 500. If the Back-Up Power Source Mode 500 is enabled 501, the controller can regularly evaluate whether the home or business is disconnected from grid power and/or whether the back-up power source is operating 502. If the controller determines that the home or business is disconnected from grid power/or the back-up power source is operating 502 YES, then Back-Up Power Source Mode is activated 503; otherwise 502 NO, the Back-Up Power Source Mode is deactivated 504. According to aspects and embodiments, one or more sources of data may be used by the controller to determine if the Back-Up Power Source is operating. According to aspects and embodiments, the Back-Up Power Source itself, can be a smart home controller, a smart electrical panel, or other intelligent onsite device that provides information on back-up power production. The information can be provided 505 through Wi-Fi, Bluetooth or other established communications methods and protocols. According to aspects and embodiments, the controller may receive 506 notifications of power outages from the local utility, the company responsible for technical management of the water heater (e.g. the manufacturer), the set-up user, or any other user of the system, or other responsible party. The controller may then check with the responsible user to confirm that the back-up power source is active or remind the user to change settings if a power outage does occur. According to aspects and embodiments, the back-up power sources power output may alter the onsite voltage sufficiently for the water heater to directly sense 507 that the back-up power supply is operational (i.e. voltage may be different on back-up power than the typical voltage from grid electricity for that location). According to aspects and embodiments, the controller monitors power supply 508 to the water heater. If the power supply is interrupted in a manner that is consistent with a power failure followed by initiation of back-up power supply, then the controller would activate Back-Up Power Supply Mode. For example, residential back-up generators take approximately six seconds to start up and provide power after a power outage. Thus, the controller may be configured to activate on a power outage lasting between four and eight seconds, for example. As another example, battery back-up systems may provide power within less than one hertz (1/60th of a second), which will allow appliances to continue operating but is a measurable signal. Upon activation, the controller may optionally text, email, or otherwise communicate with the responsible user to confirm that the power to home or business is being provided by the back-up power supply.

While operating under Back-Up Power Supply Mode, the controller can use user preference settings 509 to determine the appropriate modification of water heating settings 510. For example, target temperature setpoints may be lowered to reduce energy consumption. For a heat pump water heater, the resistive heating element may be disabled. This may be a particularly effective approach to extending back-up power supply, as the resistive element uses two to four times as much energy as the heat pump to deliver the same amount of water heating. To illustrate, the capacity of a Tesla Powerwall 2.0, a leading residential energy storage solution is 13.5 kWh. A residential water heater generally provides 8-12 kWh of heating energy per day, and the heat pump is two to four times more energy efficient than the resistive elements. While the percentage of heating provided by the heat pump varies according to weather, specific device, and usage patterns, ensuring heating only via the heat pump has the potential to save between up to six kWh per day. This is a material percentage of the overall power available from the back-up storage system and so will extend the amount of time that a battery energy storage system can provide back-up power.

While operating under Back-Up Power Supply mode, there is at least one condition under which the water heater would seek to maximize heating and thus power use. This is the condition in which the building is disconnected from the grid and there is both local distributed generation and a back-up battery and the back-up battery has a full state of charge. Under this condition, the distributed generation will be curtailed as the power cannot be stored. One way that back-up power supplies cause distributed generation to curtail is by raising the frequency of electricity provided above the inverter's threshold; for example, from 60 Hz to 66 Hz. In one embodiment, the controller would sense this shift in frequency and immediately maximize heating, thus minimizing the time period that the solar system is curtailed. In other embodiments, the distributed generation inverter, the back-up battery, a smart home controller, a smart electrical panel box, or other intelligent onsite device may provide information that the battery state-of-charge is near 100%. This information can be provided through Wi-Fi, Bluetooth or other established communications methods and protocols. For such a condition, the maximization of water heating could be accomplished by increasing the temperature setpoint. In addition, home occupants may be encouraged to utilize hot water immediately so that there is additional thermal storage capacity in the water heater, thus increasing the likelihood of the household utilizing solar production that may otherwise be curtailed.

The transition from back-up power to utility power does not generally involve a power interruption. Therefore, the controller can use one or more of a variety of methods to evaluate whether power has been restored and thus whether the Back-Up Power Supply Mode can be deactivated. According to aspects and embodiments, the back-up power supply, which can be a smart home controller, a smart panel box, or other intelligent onsite device, provides information that utility power has been restored. The information can be provided through Wi-Fi, Bluetooth or any other established communications protocol 505. According to aspects and embodiments, the controller may receive notifications of power restoration from the local utility, the company responsible for technical management of the water heater (e.g. the manufacturer) or the responsible user via text, email, smart home device (e.g., Amazon Alexa, Apple Siri, Google Home) 506. According to aspects and embodiments, the utility-provided power may have sufficiently different voltage from the back-up power supply for the water heater to directly sense that the back-up power supply is no longer operational 507.

Figure 6:
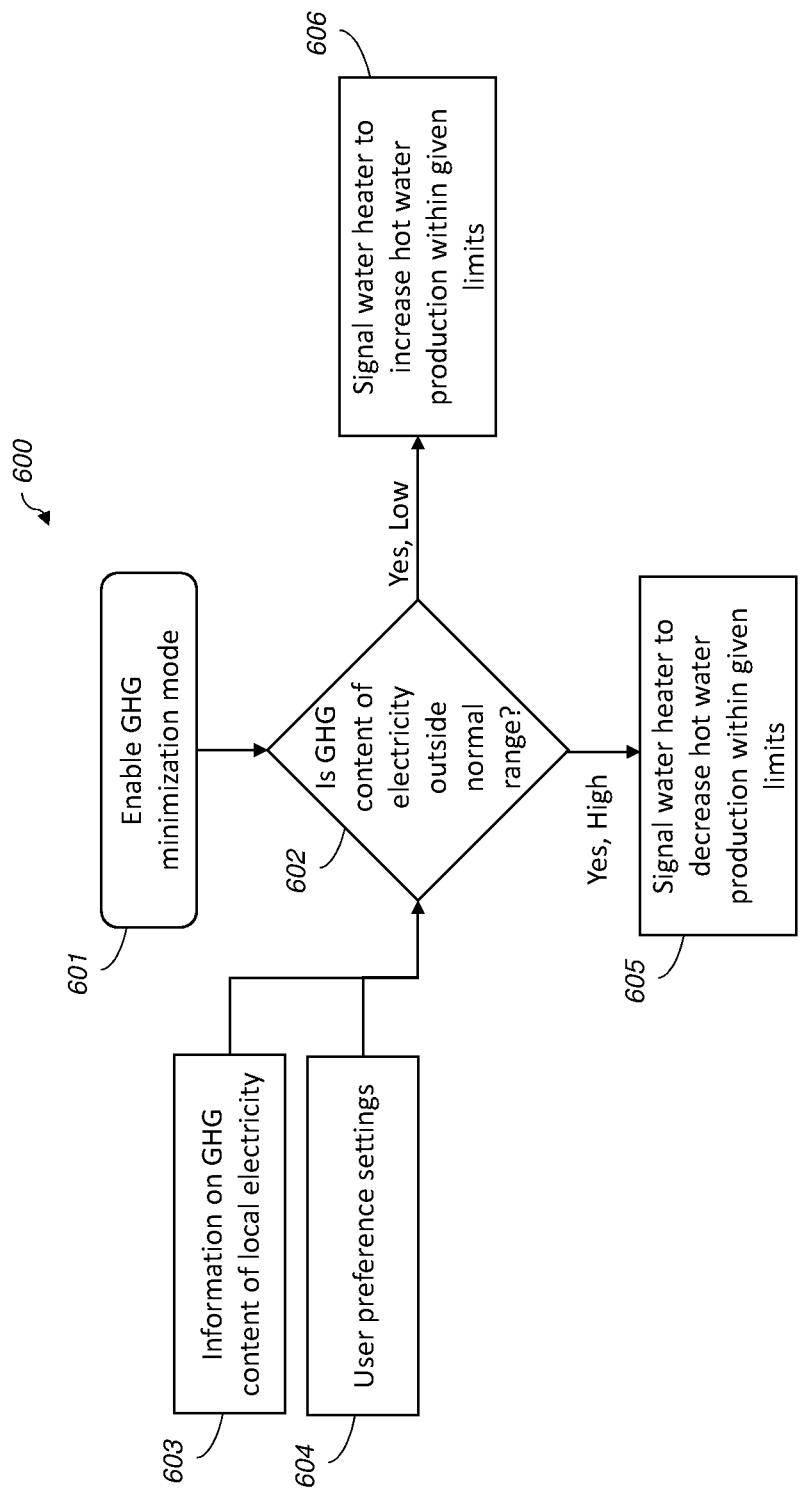
FIG. 6 is a flow chart illustrating one embodiment of a method for activation, operation and deactivation of a GHG minimization mode of operation of a hybrid water heater system.

FIG. 6 illustrates an example of a method of operation for GHG Minimization Mode 600. If the mode is enabled 601 then it shall be activated at all times. While activated, the controller regularly evaluates the carbon content of the electricity it is receiving 602, which can be accessed from third party services such as, for example, WattTime (www.watttime.org) 603. The evaluation of carbon content can be analyzed relative to user preferences 604 and the historical range of local carbon content. According to aspects and embodiments, the controller reduces water heating during times that the electricity has carbon content above the normal range 605 and increases water heating during times the electricity is below the normal range 606. The controller's method for modifying the water heating pattern may vary. For example, target temperature setpoints may be increased during periods of low greenhouse content electricity in order to increase water heating during these times. Similarly, setpoints may be lowered during periods of high greenhouse gas content to decrease water heating during these periods. Predictive algorithms may be modified to increase or decrease water heating during times of anticipated lower or higher GHG content per kWh, respectively. It is to be appreciated that the controller's methods for modifying the water heating pattern can vary by water heater technology. For example, electric resistance water heaters generally have two resistive heating elements. Heat pump water heaters have a heat pump and generally at least one resistive heating element, but may also have no resistive heating elements at all. Thus, the techniques used and the technologies available for modification can vary by water heater type.

Figure 7:
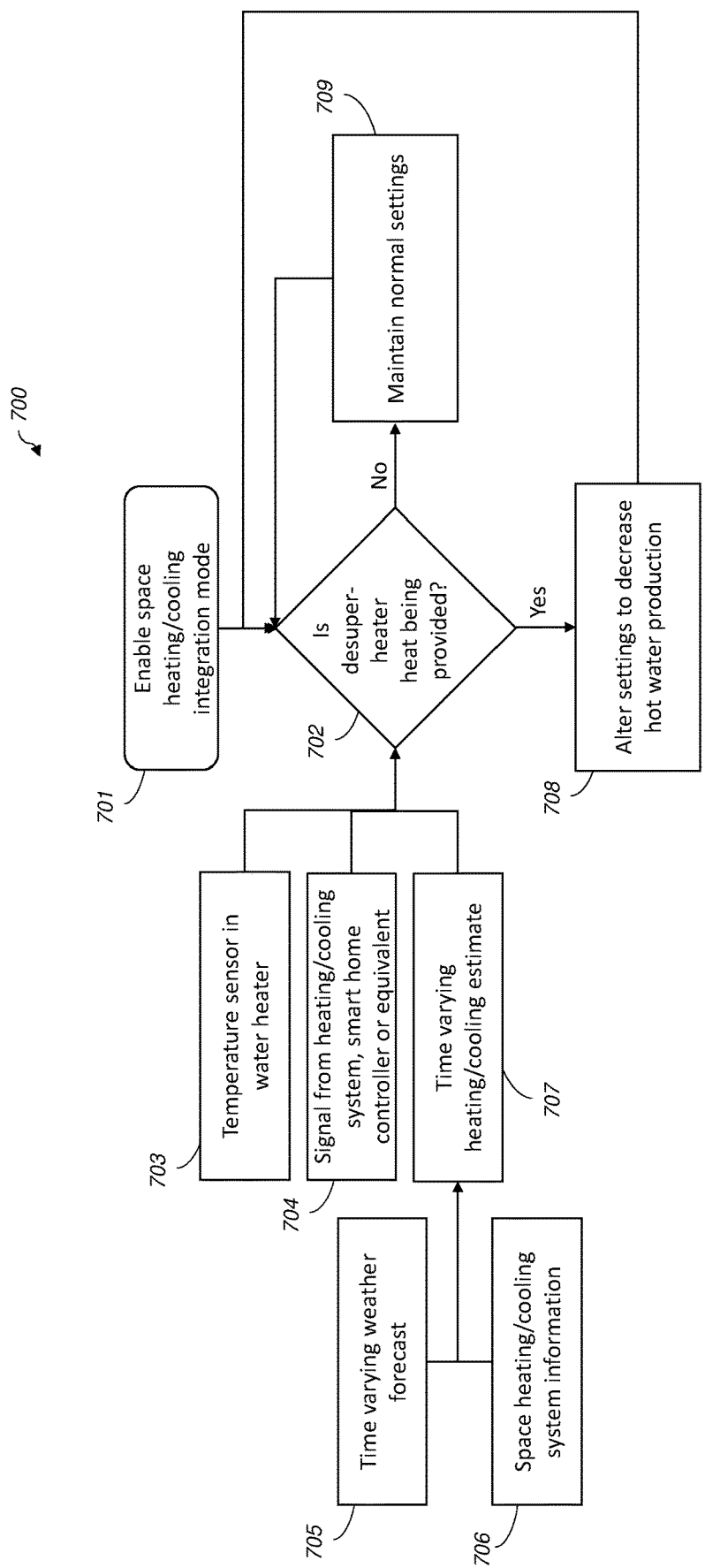
FIG. 7 is a flow chart illustrating one embodiment of a method for activation, operation and deactivation of a heating/cooling system integration mode of operation of a hybrid water heater system.

FIG. 7 illustrates one embodiment of a method of operation for Space Heating/Cooling System Integration Mode 700. If the Space Heating/Cooling System Integration Mode 700 is enabled, then it shall be activated at all times 701. While activated, the controller can regularly evaluate whether the heat pump system is providing heat to the water heater via a desuperheater 702. This can be evaluated, for example, from information received from thermostats in the water heater 703 or via communication 704 with any of the space heating/cooling system, a smart home controller, a smart panel box, or other intelligent onsite device that provides information to the controller via Wi-Fi, Bluetooth or other established communications protocol. The controller can also access a commercially available, location-specific, time-varying weather forecast 705. The controller uses any or all of this information, along with information on the space heating and cooling system 706, to provide a time-varying estimate of heating and cooling delivered by the space heating/cooling system and thus the amount of desuperheating heat that may be provided to the water heater 707 in the future. Those with ordinary skill in the art to which this disclosure belongs will recognize the availability of heating and cooling predictions. Based on this information and the resulting evaluation 702, the controller can alter settings to either decrease hot water production 708 prior to periods of desuperheating or maintain normal settings 709 when there is no desuperheating in the near term. To illustrate the advantages of this approach, water heating may be minimized during the early evening hours of cold night, as the desuperheater is likely to provide ample hot water later in the evening as temperatures drop and heating for the home or business is provided. Similarly, water heating may be minimized during the morning hours on a summer day, as the desuperheater is likely to provide ample hot water during the afternoon while providing air conditioning to the home or business. The controller's method for modifying the water heating pattern in response to the anticipated availability of desuperheating may vary. One control strategy would be to decrease temperature set points prior to anticipated periods of desuperheating availability. One benefit is that improved integration between the water heater and the desuperheater may enable the elimination of a pre-heat tank, which will save space and decrease costs.

Figure 8:
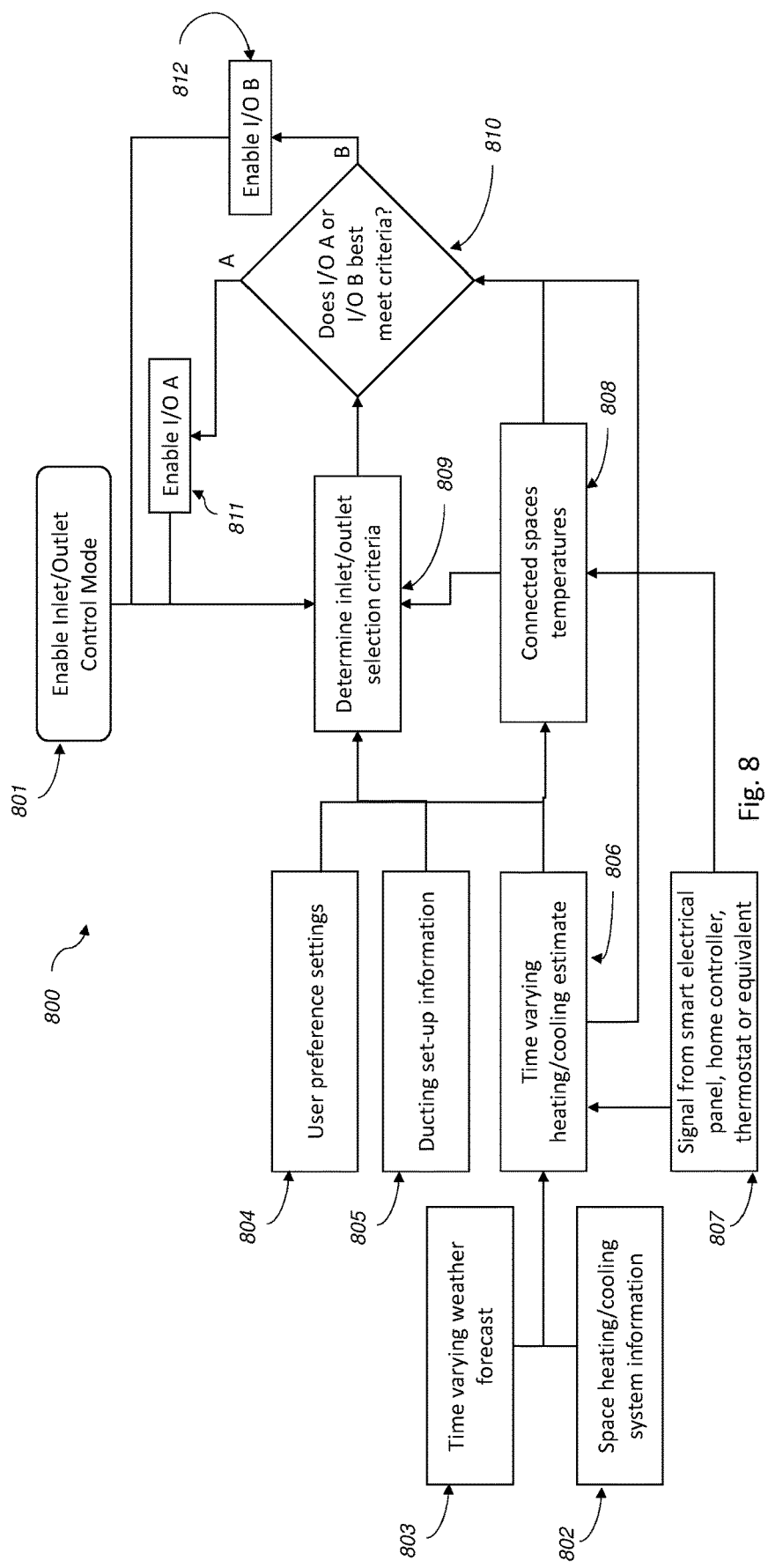
FIG. 8 is a flow chart illustrating one embodiment of a method for activation, operation and deactivation of an Air Inlet/Outlet Control Mode of operation of a hybrid water heater system.

FIG. 8 illustrates one embodiment of a method 800 of Air Inlet/Outlet Control of a hybrid water heater system. In this exemplary embodiment for Air Inlet/Outlet Control, there are two possible air inlet and outlet configurations for the hybrid water heater system, A and B. If the Air Inlet/Outlet Control mode is enabled 801, then it is activated at all times and is run on a periodic interval, such as whenever the heat pump is initiated, or on some other schedule that would otherwise be familiar to someone ordinarily skilled in the art. While activated, the controller can receive and utilize any or all of received information comprising heating and cooling system information 802, a local time varying weather forecast 803, user preference settings 804, and ducting set-up information 805. The time varying weather forecast and the space heating/cooling system information may be used to generate a time varying heating/cooling estimate 806, which may be confirmed or improved by data provided from an intelligent electrical panel, home sensor and disaggregation system device (e.g. the Sense Electrical Monitoring System), smart home controller, smart thermostat, or other equivalent device 807. These devices may communicate with the heat pump water heater via Wi-Fi, Bluetooth or other established communications protocols. The process may also provide an estimate and/or receiving a measurement of the temperature in the connected spaces 808 This information can be directly received from a smart home controller, smart thermostat or other equivalent device 807. The estimated can be based upon the time varying heating/cooling estimate 806, or directly measured by temperature sensors in the casing of the heat pump water heater, or calculated based upon data such as the energy consumption of the compressor, the temperature of the water in the tank, and/or the temperature of the refrigerant returning from the condenser. The controller utilizes the user preferences 804, ducting set-up information 805, the time varying heating/cooling estimate 806, and the connected spaces temperatures 808 to determine which criteria is prioritized in selecting the air inlet and outlet configuration 809. For example, if air inlet/outlet configuration A is for the heat pump water heater to utilize air from the basement in the home where the heat pump water heater is installed, and the user settings prioritize the avoidance of uncomfortably low temperatures in the basement, and the basement is currently already at a low temperature, then the identified most important air inlet/outlet selection criteria would be to optimize user comfort. The controller evaluates 810 whether air inlet/outlet configuration A or air inlet/outlet configuration B best meets the determined selection criteria 809. The controller then enables air inlet/outlet configuration A 811 or air inlet/outlet configuration B 812.

One embodiment of an installation scenario within which the inlet/outlet control mode will alter the configuration of the heat pump water heater comprises three characteristics. The first characteristic is the air sources and sinks to which the heat pump water heater is thermally coupled. The range of options for this characteristic comprises conditioned space, semi conditioned space, unconditioned space, and outside air. A given heat pump water heater may or may not be connected to more than two air sources and sinks. The second characteristic is the type of heating, ventilation and air conditioning (HAVC) systems in the home. The range of options for this characteristic comprises heating system types (electric resistance, central electric heat pump(s), mini-split electric heat pumps, natural gas, oil, propane, kerosene, wood, none, and permutations and combinations thereof) and cooling system types (central air conditioning, mini-split heat pumps, window air conditioning units, none, and permutations and combinations thereof). Those experienced in the art to which this invention belongs will recognize that the HVAC system types identified herein cover the significant majority but not all of the possible technologies, and that additional details may be relevant, including but not limited to heat transfer medium (e.g. forced air, water, etc.). The third characteristic is user preferences; the range of options for this characteristic include maximizing energy efficiency of the water heater, maximizing the energy efficiency of the whole home, maximizing water heating speed, maximizing occupant comfort in one or more spaces in the home, minimizing greenhouse gas emissions, maximizing the energy availability from back-up power systems, or a combination of the above. It will be appreciated that for a given installation scenario defined by the range of information from these three characteristics, the inlet/outlet control mode utilizes the previously described information, and time varying weather forecast 803, to regularly modify the inlet/outlet configuration to best meet the user preferences. It will be further appreciated that inlet/outlet mode operates across any installation scenario resulting from any combination of the characteristics which comprise an installation scenario.

It is appreciated that there are many inlet/outlet configurations that can result based on the three characteristics and such variations are considered to be within the aspects and embodiments of the disclosure. The following tables illustrate one exemplary embodiment of the air inlet/outlet configurations that provide user benefits in a particular installation scenario:

TABLE 1

Relevant Installation Information of the Heat Pump Water Heater (Example 1)

| | |
|---|---|
| Air Inlet 1 | Unducted i.e. thermally coupled to the ambient basement environment in which the heat pump water heater is located |
| Air Inlet 2 | Ducted to conditioned space within the home |
| Air Outlet 1 | Unducted i.e. thermally coupled to the ambient basement environment in which the heat pump water heater is located |
| Air Outlet 2 | Ducted to conditioned space within the home |
| Home Heating and Cooling | Rooms within the home are conditioned, except for the basement |
| Mechanical Systems | Heating: electric resistance; Cooling: central air conditioning |
| User Preferences | Minimization of overall energy use is the priority |

TABLE 2

Air Opening Configuration Based on Seasonality for Table 1 Installation Scenario

| Parameter | Spring (Temperate, Moist) | Summer (Warm, Humid) | Fall (Temperate, Dry) | Winter (Cold, Dry) |
|---|---|---|---|---|
| Air Inlet 1 | Open | Closed | Open | Open |
| Air Inlet 2 | Closed | Open | Closed | Closed |
| Air Outlet 1 | Open | Closed | Open | Open |
| Air Outlet 2 | Closed | Open | Closed | Closed |
| Net Effect | Heat pump water heater utilizes ambient air in basement to avoid increasing the heating burden. Basement air is cool and moist; energy use is significantly less than an electric resistance water heater | Heat pump water heater utilizes air from conditioned space, thus decreasing the energy use of the air conditioning system. Heat pump water heater energy use is lowered by utilizing air that is warmer than the basement | Heat pump water heater utilizes ambient air in basement to avoid increasing the heating burden. Basement air is cool and moist; energy use is significantly less than an electric resistance water heater | Heat pump water heater utilizes ambient air in basement to avoid increasing the heating burden. Basement air is cool and moist; energy use is significantly less than an electric resistance water heater |

It is to be understood that Table 2 is a summary and that the exact air opening configuration may be determined by specific information for a given moment in time. For example, on a cold day in the springtime the controller may enable the configuration in Table 2 provided for the winter and on a hot day in the springtime the controller may enable the configuration in Table 2 provided for the summer.

The following tables illustrate a second exemplary embodiment of the air inlet/outlet configurations that provide user benefits in a particular installation scenario:

TABLE 3

Relevant Installation Information of the Heat Pump Water Heater (Example 2)

| | |
|---|---|
| Air Inlet 1 | Unducted i.e. thermally coupled to the ambient basement environment in which the heat pump water heater is located |
| Air Inlet 2 | Ducted to conditioned space within the home |
| Air Outlet 1 | Unducted i.e. thermally coupled to the ambient basement environment in which the heat pump water heater is located |

TABLE 3-continued

Relevant Installation Information of the
Heat Pump Water Heater (Example 2)

| | |
|---|---|
| Air Outlet 2 | Ducted to conditioned space within the home |
| Home Heating and Cooling Mechanical Systems | Rooms within the home are conditioned, except for the basement. Heating: natural gas; Cooling: central air conditioning |
| User Preferences | First priority: preservation of comfort in the basement |

TABLE 4

Air Opening Configuration Based on Seasonality for Table 3 Installation Scenario

| Parameter | Spring (Temperate, Moist) | Summer (Warm, Humid) | Fall (Temperate, Dry) | Winter (Cold, Dry) |
|---|---|---|---|---|
| Air Inlet 1 | Open | Closed | Open | Open |
| Air Inlet 2 | Closed | Open | Closed | Closed |
| Air Outlet 1 | Open | Closed | Open | Open |
| Air Outlet 2 | Closed | Open | Closed | Closed |
| Net Effect | Heat pump water heater utilizes ambient air in basement to avoid increasing the heating burden, unless the temperature drops in the basement below a user-set comfort threshold. Then heat pump water heater utilizes air from the conditioned space | Heat pump water heater utilizes air from conditioned space, thus decreasing the energy use of the air conditioning system. Heat pump water heater energy use is lowered by utilizing air that is warmer than the basement | Heat pump water heater utilizes ambient air in basement to avoid increasing the heating burden, unless the temperature drops in the basement below a user-set comfort threshold. Then heat pump water heater utilizes air from the conditioned space | Heat pump water heater uses air from the conditioned space to prevent cooling the basement below a user-set comfort threshold |

It is to be understood that Table 4 is a summary and that the exact air opening configuration may be determined by specific information for a given moment in time. For example, on a cold day in the springtime the controller may enable the configuration in Table 4 provided for the winter and on a hot day in the springtime the controller may enable the configuration in Table 4 provided for the summer.

The following tables illustrate a third exemplary embodiment of the air inlet/outlet configurations that provide user benefits in a particular installation scenario:

TABLE 5

Relevant Installation Information of the
Heat Pump Water Heater (Example 3)

| | |
|---|---|
| Air Inlet 1 | Ducted to the outside of the home |
| Air Inlet 2 | Ducted to conditioned space within the home |
| Air Outlet 1 | Ducted to the outside of the home |
| Air Outlet 2 | Ducted to conditioned space within the home |
| Home Heating and Cooling Mechanical Systems | Rooms within the home are conditioned, except for the basement. Heating: air source heat pump; Cooling: air source heat pump |
| User Preferences | Prioritize overall energy efficiency of the home. Comfort in conditioned space is the second priority |

TABLE 6

Air Opening Configuration Based on Temperature
for Table 5 Installation Scenario

| Parameter | Cold | Warm | Hot |
|---|---|---|---|
| Air Inlet 1 | Closed | Open | Closed |
| Air Inlet 2 | Open | Closed | Open |
| Air Outlet 1 | Closed | Open | Closed |
| Air Outlet 2 | Open | Closed | Open |
| Net Effect | Heat pump water heater utilizes air from the conditioned space to increase its efficiency. The burden on the heat pump for the conditioned space is less than the loss of efficiency from using cold air in the heat pump water heater | As there is no material energy efficiency gain from either configuration, outside air is used in the heart pump water heater so as to not cool the conditioned space. If there is a material energy benefit from an alternative configuration, that would be used instead | Heat pump water heater utilizes air from the conditioned space. The benefit on the heat pump for the conditioned space is greater than the loss of efficiency from using warmer air in the heat pump water heater |

It is to be understood that Table 6 is a summary and that the exact air opening configuration may be determined by specific information for a given moment in time.

According to various aspects and embodiments, the controller provides control instructions comprising alterations of, prioritizations between, and activations and/or deactivations of the herein disclosed advanced modes to maximize customer benefits between the various modes. It is appreciated that there are many variations and combinations of the herein disclosed advanced modes that can result, and such variations and combinations are considered to be within the aspects and embodiments of the disclosure. For the sake of brevity, the following Table 3 illustrates one embodiment of the controller operation.

TABLE 7

An Embodiment of Controller Actions Between Advanced Modes

| | Distributed Generation (DG) | Back-Up Power Supply (BUPS) | Heating & Cooling Integration (HCI) | Inlet/Outlet Valve Control (IOVC) | GHG Minimization (GHGM) |
|---|---|---|---|---|---|
| Distributed Generation (DG) | | DG deactivated | HCI prioritized over DG | Compatible and operate independently | Prioritize DG self-utilization |
| Back-Up Power Supply (BUPS) | | | Compatible and operate independently | Alter IOVC to minimize energy use | GHGM deactivated |
| Heating & Cooling Integration (HCI) | | | | Compatible and operate independently | Prioritize HCI |
| Inlet/Outlet Valve Control (IOVC) | | | | | Compatible and operate independently |
| GHG Minimization (GHGM) | | | | | |

In this embodiment, Distributed Generation may be deactivated during Back-Up Power Supply Mode, as Distributed Generation Mode is not applicable while the building is disconnected from utility power; Heating/Cooling Integration Mode may be given precedence to Distributed Generation Mode as free water heating is more economically beneficial than optimizing the coincidence of water heating and distributed generation power production; If the user wishes to prioritize GHG Minimization and has a Distributed Generation system, then maximizing the coincidence of water heating and distributed generation power production would best achieve this goal; during Back-Up Power Supply Mode, Inlet/Outlet Valve Control may be modified to prioritize the minimization of energy use regardless of comfort impacts; during Back-Up Power Supply Mode, GHG Minimization may be deactivated as GHG Minimization is not applicable while the building is disconnected from utility power; the other modes are compatible and may operate simultaneously and independently.

Figure 9:
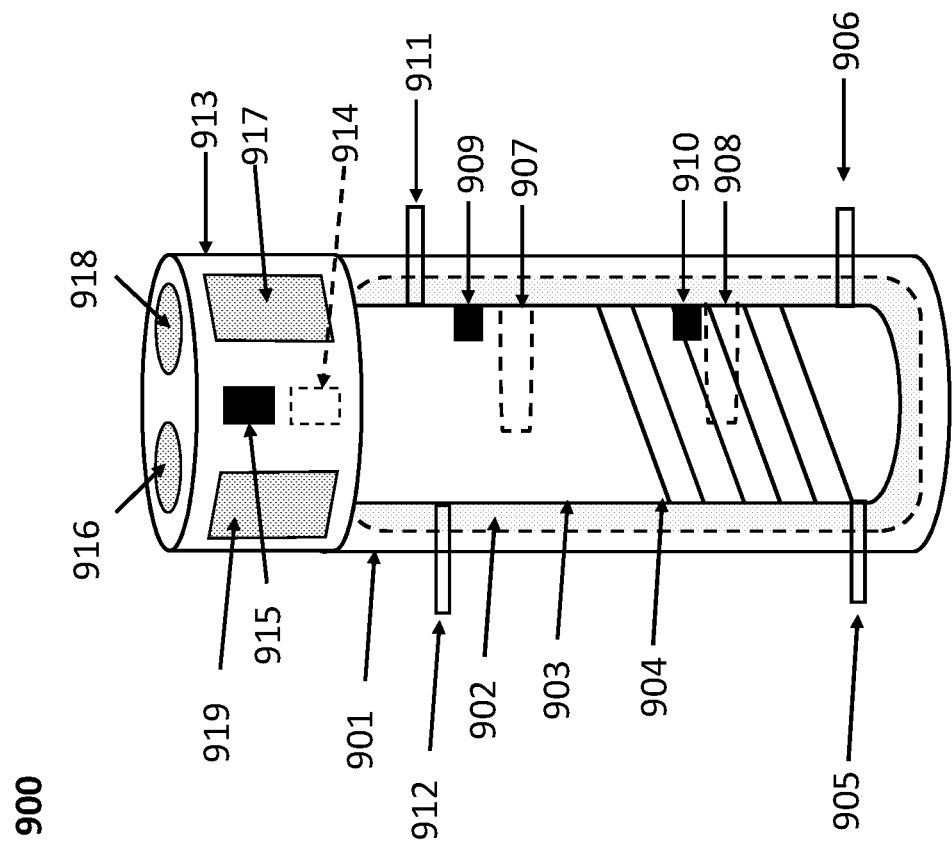
FIG. 9 is a partially cut-away perspective view of an embodiment of a heat pump water heater.
Figure 10:
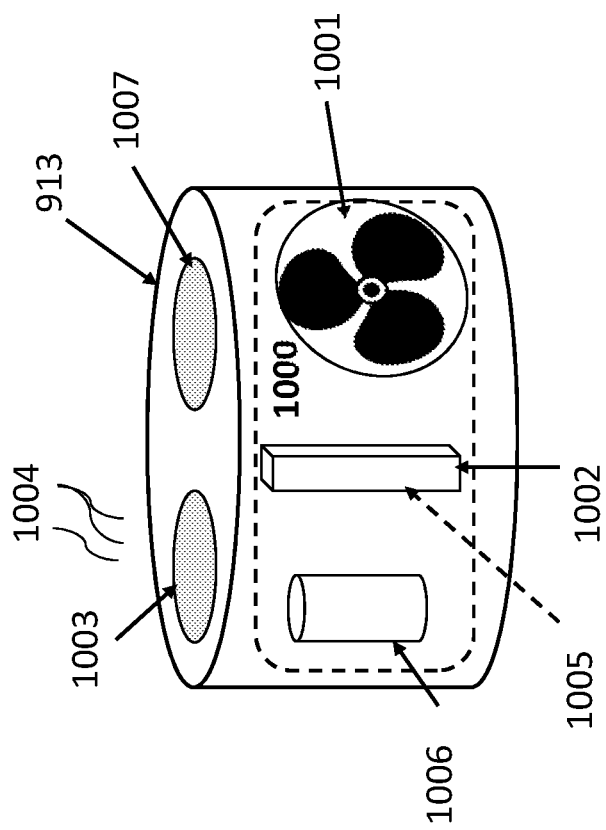
FIG. 10 illustrates a cut-away perspective view of the heat pump assembly within the heat pump casing.

Another aspect of the disclosure is a method for implementing and controlling the airflow of a heat pump water heater. FIG. 9 illustrates a partially cut-away perspective view of an exemplary embodiment of a heat pump water heater 900. The heat pump water heater includes an outer tank casing 901 that encloses insulation 902 between tank casing 901 and inner tank 903. Wrapped around the outside of the tank 903 is a condenser 904 of the heat pump system 1000 (See FIG. 10) although in other exemplary embodiments the condenser may be immersed inside the tank 903. A drain outlet 905 and an inlet 906 are each located near the bottom of the heat pump water heater 900 and are coupled to the inner tank 903 through the casing 901. An outlet 911 is located near the top of the heat pump water heater and is coupled to the inner tank 903 through the casing 901. In some embodiments, the inlet 906 and outlet 911 may be coupled to one another with a mixing valve that regulates the temperature of the fluid at the outlet. Inside the tank 903 are an upper heating element 907 and a lower heating element 908, although in other embodiments there may be a different number of heating elements used, and the installation configuration may vary from what is shown e.g. the elements may be installed horizontally, vertically, or some combination thereof and the installation location may be anywhere within the tank 903. The heating elements may be an electric resistance element or another type of heating element. An upper thermostat 909 is located in the upper portion inside the tank 903 and measures the temperature inside an upper portion of the tank 903. A lower thermostat 910 is located in the lower portion of the tank 903 and measures the temperature in a lower region of the tank. In other embodiments, a different number of thermostats may be used and may be located in different regions of the tank than what is shown. A temperature and pressure relief valve 912 is also coupled to the inner tank 903 through the casing 901. A controller 914 is located within the heat pump water heater 900 to control operation of the heat pump water heater 900, and may include on-board software comprising memory, one or more processing devices, and communication components such as internet wireless radio (Wi-Fi), Bluetooth, and/or comparable communication mediums enabling a user to remotely operate the heat pump water heater 900 and/or modify the settings and parameters therein, via a smartphone application for example. The heat pump water heater 900 may also contain an on-unit control panel 915 enabling a user to manually select various modes, settings, and other parameters to control the heat pump water heater 900, which would otherwise be familiar to someone ordinarily skilled in the art. The upper portion of the heat pump water heater 900 comprises an outer casing 913 which encloses a heat pump assembly 1000 such as shown in FIG. 10. The casing 913 includes air inlets 916 and 919 comprising a partial or full opening and air outlets 917 and 918 each comprising a partial or full opening. For example, the air inlets 916, 919 and air outlets 917 and 918 may comprise a mesh, grille, or other type of cutout enabling a partial or full opening in the heat pump casing 913. In other embodiments, there may be two air inlets and one air outlet, one air inlet and two air outlets, or other combinations thereof so long as at least three air openings are used. Having at least three air openings enables the heat pump water heater 900 to be coupled to at least two air sources and/or air sinks. This capability is advantageous as it enables the heat pump water heater 900 to draw air from and/or expel air to either unconditioned space or conditioned space within the building envelope, or exterior space outside of the building envelope depending on which configuration may be most advantageous for the operational efficiency of the heat pump, the operational efficiency of the home, and/or the personal preferences of an end-user. In other embodiments, the location of the air openings on the heat pump casing 913 may vary from what is shown in FIG. 9.

FIG. 10 provides a cut-away perspective view of the heat pump system or subassembly 1000 according to one embodiment of this disclosure. The heat pump assembly is enclosed within casing 913 of FIG. 9. In one embodiment air inlet 1003 is located on top of casing 913. A fan 1001 draws in air 1004 through the air inlet 1003 on the top of the housing 913 and across an evaporator 1002. In other embodiments, the air inlet 1003 may be located on the side of the casing 913 and/or more than one air inlet may be used. Heat from the ambient air 1004 is transferred into refrigerant 1005 within the evaporator 1002 of the heat pump subassembly 1000. The evaporator 1002 is coupled to a compressor 1006 such that the warmed refrigerant 1005 travels from the evaporator 1002 to the compressor 1006 where it is compressed and further heated before travelling into the condenser coil 904 of FIG. 9. which is coupled to the compressor 1006 with piping and/or plumbing which would be familiar to someone ordinarily skilled in the art. The condenser coils 904 of FIG. 9 transfer heat into the inside of the tank 903 to heat the fluid inside which may be water or another medium. The refrigerant 1005 returns to the evaporator 1002 which is also coupled to the condenser coils 904 via piping and/or plumbing which would be familiar to someone ordinarily skilled in the art. As a result of this thermodynamic process, according to one embodiment cooled and dehumidified air is expelled out of the air outlet 1007, although in other embodiments the air may be expelled via a different air outlet, such as the opening 917 of FIG. 9 on the side of casing 913. The heat pump assembly 1000 may also contain other typical ancillary heat pump components which are not shown but would be familiar to someone ordinarily skilled in the art e.g. an expansion valve, filter-drier, electronics, sensors, and more.

Figure 11:
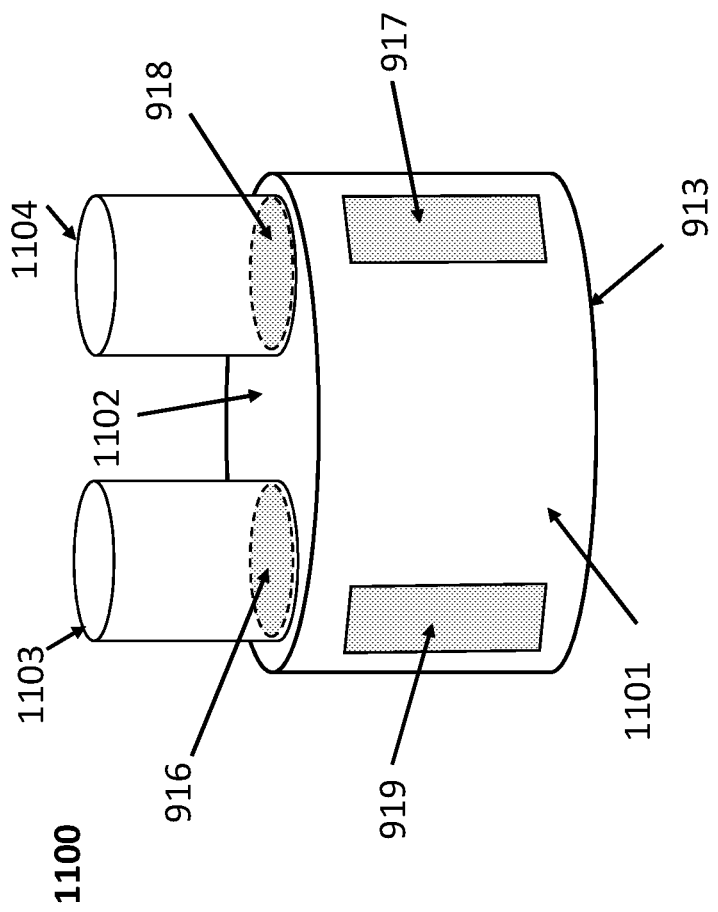
FIG. 11 illustrates an exterior perspective view of the heat pump casing with three or more openings.

FIG. 11. Illustrates an exterior perspective view showing an embodiment 1100 of the heat pump casing 913 of the heat pump water heater 900 which comprises four air openings 916, 917, 918, and 919 and includes ducting 1103 and 1104 which operatively couple with the openings 916 and 918 respectively. In other embodiments a different number of air openings may be used as long as there are three or more openings. The heat pump casing 913 comprises a cylindrical structure 1101 and top portion 1102 which encloses the heat pump assembly 1000 of FIG. 10 and is part of the overall heat pump water heater assembly 900 of FIG. 9. The casing 913 may be made of metal, plastic, or other suitable materials as would be familiar to someone ordinarily skilled in the art. It is appreciated that although preferable and consistent with the water heater casing 913, in other embodiments the heat pump casing may be rectangular or another shape which would be suitable for housing the components and familiar to someone ordinarily skilled in the art. In a preferred embodiment, the heat pump casing 913 comprises four air openings: air inlet 916 on the top of the casing 913; air inlet 919 on the side of the casing 913; air outlet 918 on the top of the casing 913; and air outlet 917 on the side of the casing 913. In other embodiments there may be two air inlets and one air outlet, two air outlets and one air inlet, or some other combination thereof where at least three air openings are used. In other embodiments, the air openings may be located solely on the top of the casing 913, solely on the side of the casing, or some combination thereof. The air openings may comprise a grille, mesh, or other partial or full opening which would be familiar to someone ordinarily skilled in the art. The air openings 916, 917, 918, and 919 enable airflow through the heat pump casing 913. Air inlets 916 and 919 enable air to enter the heat pump casing 913 to transfer heat to the refrigerant 1005 via the evaporator 1002 while air outlets 917 and 918 enable cooled air to leave the heat pump casing 913. One or more of the air openings of the heat pump casing 913 may be connected to ducting including flexible insulated ducting, flanges, elbows, tape, terminations, and other accessories familiar to those having ordinary skill in the art. In the preferred embodiment, air inlet 916 and air outlet 918 are coupled to ducts 1103 and 1104, respectively, and are therefore thermally coupled to conditioned space within the building envelope while air inlet 919 and air outlet 917 are not coupled to ducting and are therefore thermally coupled to the ambient environment around the heat pump water heater 900. In other embodiments, the air openings 916, 917, 918, and 919 may be configured in other combinations with and without ducting so as to provide thermal coupling to and/or from the ambient area around the heat pump water heater, another area within the building envelope, or the environment outside the building envelope. Having at least three air openings enables the heat pump water heater 900 to be coupled to at least two air sources and/or air sinks. This capability is advantageous as it enables the heat pump water heater 900 to draw air from and/or expel air to either unconditioned space or conditioned space within the building envelope, or exterior space outside of the building envelope depending on which configuration may be most advantageous for the operational efficiency of the heat pump, the operational efficiency of the home, and/or the personal preferences of an end-user. For instance, referring again to FIG. 11, and recalling that the air openings air inlet 916 and air outlet 918 are ducted to conditioned space while the air openings air inlet 919 and air outlet 917 are not ducted and therefore coupled to the ambient space around the heat pump water heater 100, it would be advantageous to the consumer in summer months to have air outlet 918 be the preferred outlet path for the heat pump air so as to cool the conditioned space. In particular, because the outlet air from a heat pump is cooled and dehumidified due to the vapor compression cycle, and because the outlet 918 is thermally coupled to conditioned space, a user may be able to offset or minimize the load on the building envelope's HVAC system by leveraging the cool heat pump outlet air. Conversely, in the winter this interaction and cooling effect may not be desired, and thus air outlet 917 may be used as it is thermally coupled to the ambient space around the heat pump water heater 900. The cold air could also be expelled to the outside, i.e. through the same air outlet or different air outlet. Thus an advantage of this arrangement having two air openings 917 and 918 serving as air outlets is that the system has the flexibility to switch the air outlet to the opening 917 in the winter so that the cool heat pump air is expelled into ambient space and therefore does not burden the heating of the building envelope's HVAC system, which would likely be heating conditioned space. A different benefit is enabled by having at least two air openings 916 and 919 serving as air inlets. Because heat pump operational efficiency increases when the air across the evaporator is warmer, whichever air inlet 916 or 919 is coupled to warmer air may be selected as the air source to therefore improve the operational efficiency of the heat pump assembly 1000. For example, in the winter months the warmer air from the conditioned space may be drawn into the inlet 916, while in the warmer months the ambient air surrounding the heat pump casing may be drawn in through the inlet 919. Thus, according to aspects and embodiments of the disclosure, benefits may be attained by leveraging the use of at least three controllable air openings on the heat pump water heater 900. According to aspect and embodiments, the ability to select between air inlets 916 and 919 and/or between air outlets 917 and 918 may be done automatically by the controller 914, or manually by an end user who controls the device directly with the on-unit control panel 915 or with a device that is remotely communicative with the heat pump water heater controller 914, for instance with a smartphone application. The control of airflow through one air opening vs. another may be facilitated via the use of a damper, valve, or other mechanism which would be familiar to someone ordinarily skilled in the art, some embodiments of which are described further below.

FIGS. 13A-B illustrate a top-down view showing two configurations 1300 and 1301 for controlling airflow to first opening 1303 and second opening 1305 of the heat pump water heater subsystem, and FIGS. 13C-D illustrate their respective perspective views 1308 and 1309. A first damper 1302 is coupled to first air opening 1303, and a second damper 1304 is coupled to second air opening 1305. In a preferred embodiment each of these dampers comprises a physical body coupled to an actuator coupled to a controller that is configured to control the actuator to actuate the damper to move its position relative to its corresponding opening so as to either cover or uncover said opening, or to partially cover said opening. The first damper 1302 is coupled to actuator 1306 and the second damper 1304 is coupled to a second actuator 1307. In other embodiments there may be a different number of actuators implemented. The actuators 1306 and 1307 are operated by the controller 914, and in one embodiment each actuator comprises a motor coupled to a mechanical linkage enabling each actuator to physically move its corresponding damper. In other embodiments, the actuator may comprise a different mechanical design which would be familiar to someone otherwise ordinarily skilled in the art, such as gearing or another design. The position of either damper 1302 and 1304 determines whether that damper is covering its corresponding air opening thus prohibiting airflow, or leaving its corresponding opening unblocked so as to allow airflow. In some embodiments, the controller may be configured to actuate the damper to be in a position so as to partially cover its air opening. Thus, the position of damper 1302 controls the airflow through air opening 1303 while damper 1304 controls airflow through air opening 1305. According to aspects and embodiments, this movement may be initiated automatically by the controller 914, or the movement may be initiated manually by a user either operating the unit directly via the control panel 915 or remotely with wireless communication, for instance via a smartphone app.

Referring again to FIGS. 13A,C, in configuration 1300 the air opening 1303 is considered to be open since its corresponding damper 1302 is not blocking the opening, while air inlet 1305 is considered to be closed as its corresponding damper 1304 is blocking the opening. Thus, in the configuration 1300, air opening 1303 can be considered the air source and/or sink of choice for the heat pump water heater 900. Referring now to configuration 1301 of FIGS. 13B,D the actuators 1306 and 1307 have moved the position of their respective dampers 1302 and 1304 such that damper 1302 is now blocking air opening 1303 while damper 1304 has moved to allow airflow through air opening 1305. Thus, in configuration 1301 air opening 1305 has been chosen as the preferred air source and/or sink for the heat pump water heater 900.

FIGS. 14A-B illustrate a top-down view showing two configurations 1400 and 1401 for controlling airflow to first set of louvers or vents 1402 coupled to a first air opening 1403, and a second set of louvers or vents 1404 coupled to a second air opening 1405 of one preferred embodiment for controlling which opening the airflow passes through. The first set of louvers or vents 1402 is coupled to a first air opening 1403, and the second set of louvers 1404 is coupled to a second air opening 1405. In the illustrated embodiment, each set of these louvers comprises a series of bodies coupled to an actuator enabling the louvers to rotate position such that in one position airflow is prohibited (i.e. when the louver body is perpendicular to the airflow) while in a second position airflow is allowed (i.e. when the louver body is parallel to the airflow). The first set of louvers 1402 is coupled to actuator 1406 while the second set of louvers 1404 is coupled to a second actuator 1407. In other embodiments there may be a different number of actuators implemented. The actuators 1406 and 1407 are operated by the controller 914, and each comprises a motor coupled to a mechanical linkage enabling each actuator to physically move its corresponding set of louvers. In other embodiments, the actuator may comprise a different mechanical design which would be familiar to someone otherwise ordinarily skilled in the art, such as gearing or another design. Thus, the position of the louvers 1402 controls the airflow through air opening 1403 while the louvers 1404 controls airflow through air opening 1405. According to aspects and embodiments, this movement may be initiated automatically by the controller 914, or the movement may be initiated manually by a user either operating the unit directly via the control panel 915 or remotely with wireless communication, for instance via a smartphone app.

Referring again to FIGS. 14A,C, in configuration 1400 the air opening 1403 is considered to be open since its corresponding set of louvers 1402 is rotated to a position such as to allow airflow 1408 to pass through, while air opening 1405 is considered to be closed as its corresponding set of louvers 1404 is rotated to a position such as to block airflow through the opening. Thus, in the configuration 1400, air opening 1403 can be considered the air source and/or sink of choice for the heat pump water heater 900. Referring now to configuration 1401 of FIGS. 14B,D, the actuators 1406 and 1407 have moved the position of their respective louvers 1402 and 1404 such that louvers 1402 are now blocking air opening 1403 while the louvers 1404 have moved to allow airflow 1409 through air opening 1405. Thus, in configuration 1401 air opening 1405 has been chosen as the preferred air source and/or sink for the heat pump water heater 900.

Referring again to FIGS. 13A-D and/or FIGS. 14A-D, and to Table 1 and Table 2, the ability to have one or more controllable air openings is advantageous as it enables dynamic selection of the air source and/or sink for the heat pump water heater 900 which can enable advantageous performance in certain situations. For example, consider a scenario where air opening 1305 is and unducted air inlet i.e. thermally coupled to the ambient space around the heat pump water heater 900, and air opening 1303 is a ducted air inlet i.e. thermally coupled to a conditioned space within the home. The efficiency of a heat pump increases with increasing temperature of the air being drawn in, as more heat is readily available to be transferred into the refrigerant 1005 within the heat pump assembly 1000. Thus, in the summer—when the air around the heat pump water heater 900 may be warmer than the air within the conditioned space (which is likely to be cooled by the building envelope's HVAC system), it would be advantageous for the heat pump water heater 900 to draw air in through air opening 1305. Conversely, in the fall or winter, when the ambient air around the heat pump water heater 900 is likely to be colder than the air in the conditioned space, it would be more advantageous for the heat pump to draw air in via inlet 1303. In other embodiments, the heat pump water heater 900 may have alternate configurations of air inlets and/or outlets which are ducted and/or unducted, and the most beneficial airflow configuration of airflow through these openings may vary depending on the building envelope, installation location, HVAC system, and other parameters. For instance, both air openings 1303 and 1305 may be air inlets which are ducted to multiple conditioned spaces within the home, to the exterior of the home, or some combination thereof. Other configurations are possible as would be familiar to one ordinarily skilled in the art. Having more than one possible air source and/or air sink enables the system to utilize the most desired air source and/or air sink based on a combination of environmental conditions, consumer preferences, total home energy use, and other parameters. Thus, the ability to have more than one air inlet and/or outlet, each with controllable airflow, is advantageous.

Figure 15:
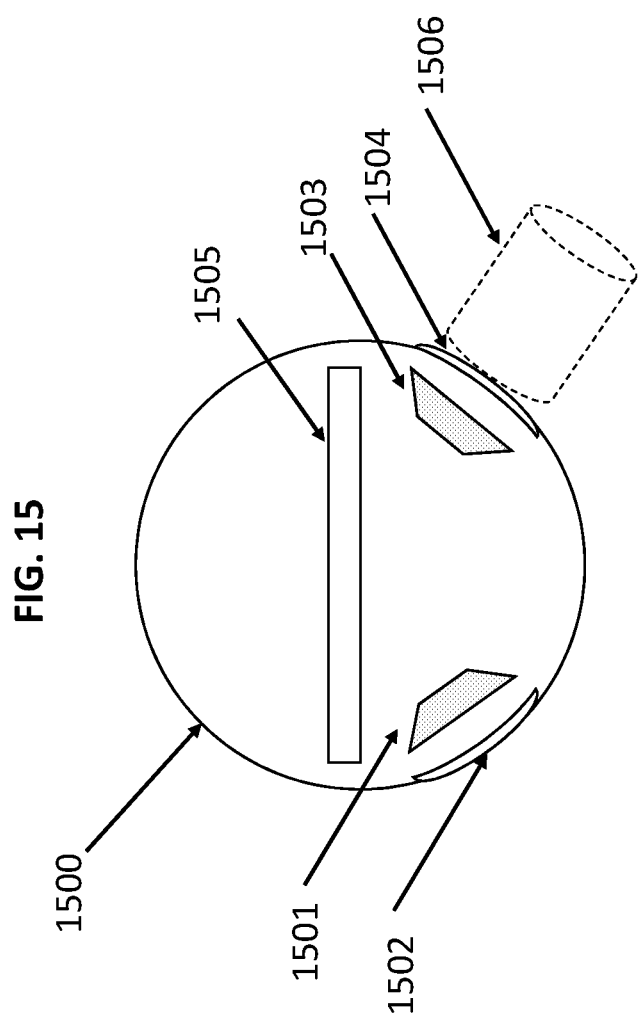
FIG. 15 illustrates a top down view of an embodiment of heat pump water heater system with at least one outlet fan.

FIG. 15 illustrates a top-down cutaway view of the heat pump casing 1500 of heat pump water heater 900 illustrating some of the components of a preferred embodiment in which at least two fans are provided within the casing. A fan 1501 is coupled to an air opening 1502 on the heat pump casing 1500 and a fan 1503 is coupled to an air opening 1504. In other embodiments the fans 1501 and 1503 may be blowers, impellers, or another mechanical device for generating airflow within the heat pump casing 1500 as would be familiar to someone ordinarily skilled in the art. When fan 1501 is turned on, air is drawn in across the evaporator 1505 and expelled out the air opening/outlet 1502. Similarly, when fan 1503 is turned on, air is drawn in across the evaporator 1505 and expelled out the air opening 1504. Thus, by altering which fan is activated at a given time, the air sink for the heat pump water heater 900 may be altered. In some embodiments, the openings 1502 and 1504 may also be coupled to dampers coupled to at least one actuator coupled to the controller 914 which can operatively move the damper positions relative to the openings in order to block or at least partially uncover each opening to help block or facilitate airflow, respectively. According to aspects and embodiments, the controlling of each fan can be done by the controller that is configured to control each of the fans to be on and off. It is appreciated however that the operation of each fan 1501 and 1502 may be controlled manually by a user either via the on-unit control panel 915 or remotely with wireless communication, via a smartphone application for example. According to aspects and embodiments, the controlling of each fan can be done by the controller that is configured to control each of the fans to be on and off in cooperation with the opening and closing of the respective air openings. In the preferred embodiment, air opening 1502 is thermally coupled to the ambient space around the heat pump water heater 900 while air outlet 1504 is ducted to conditioned space within the home via the ducting 1506. In other embodiments, other ducting configurations may be used as would be familiar to one ordinarily skilled in the art. For instance, one opening may be ducted to conditioned space within the building envelope while the other opening may be ducted to space outside of the building envelope.

For example, in the summertime or when the weather is warm, it would be advantageous for the system to expel air via air opening 1504 which is ducted and therefore thermally coupled to conditioned space. Because the outlet air from a heat pump is cooled and humidified, sending this air to conditioned space can help provide auxiliary cooling and thus reduce the cooling load of the home's HVAC system. In the winter, or in colder weather, it may be more advantageous to direct the cool air via air opening 1502 which is not ducted and therefore is thermally coupled to the ambient space around the heat pump water heater 900, so as to not to provide any cooling effect within the conditioned space within the home. In other embodiments, other advantageous ducting and/or airflow configurations are possible and depend on multiple factors including the environment, installation location, user preferences, and other parameters as would be familiar to one ordinarily skilled in the art. By enabling the system to have more than one air opening serving as an air outlet, the most desirable air sink for the heat pump assembly 1000 may be selected based on a combination of environmental conditions, consumer preferences, total home energy use, and other parameters.

FIGS. 16A-B illustrate a top-down cutaway views of another embodiment of the heat pump water heater subsystem comprising a fan 1602, wherein the fan 1602 is configured to be able to rotate on a fixed vertical axis 1607 within the heat pump casing 1601 so as to change which air opening 1603 or 1605 the fan is coupled to depending on its rotational position within the housing. For instance, when rotated in a first direction, the fan 1602 is coupled to air opening 1603 and therefore draws air in across the evaporator 1604 and expels it through opening 1603, as shown in configuration 1600. When rotated to second position around the axis 1607, as shown in configuration 1606, the fan 1602 draws air in across the evaporator 1604 and expels air out the opening 1605. In the illustrated embodiment, both of these opening 1603 and 1605 are on the side of the heat pump casing 1601. In other embodiments, the fan 1602 may rotate on a fixed horizontal axis within the heat pump casing 1601 such that in one position that fan is coupled to an opening on the side of the heat pump casing 1601, while in a second position it's coupled to an opening on the top of the casing 1601. According to aspects and embodiments, the controlling of the fan can be done by the controller that is configured to control the position of the fan as well as controlling the fan to be on and off. It is appreciated however that the fan position may be controlled manually by a user either via the on-unit control panel 915 or remotely with wireless communication, via a smartphone application for example. In some embodiments, the openings 1603 and 1605 may be coupled to dampers coupled to at least one actuator coupled to the controller 914 which can operatively move the damper positions relative to the openings in order to block or at least partially uncover each opening to help block or facilitate airflow, respectively. According to aspects and embodiments, the controlling of the fan 1602 can be done by the controller that is configured to control the position of the fan in cooperation with the opening and closing of the respective air openings. In the preferred embodiment, air opening 1603 is thermally coupled to the ambient space around the heat pump water heater 900 while air opening 1605 is ducted to conditioned space within the home via ducting 1608. In other embodiments, other advantageous ducting and/or airflow configurations may be used as would be familiar to one ordinarily skilled in the art. For instance, one outlet may be ducted to conditioned space within the home while the other outlet may be ducted to space outside of the home. By enabling the system to have more than one air opening serving as an air outlet, the most desirable air sink for the heat pump assembly 1000 may be selected based on a combination of environmental conditions, consumer preferences, total home energy use, and other parameters as previously described.

FIGS. 17A-B illustrate a top-down cutaway views of another embodiment of the heat pump water heater subsystem wherein a fan 1702 moves along a track 1707 within the heat pump casing 1700 so as to change which air opening 1703 or 1705 the fan is coupled to depending on its position within the housing. For instance, when positioned at one side of the track 1707, the fan 1702 is coupled to opening 1703 and therefore draws air in across the evaporator 1704 and expels it through opening 1703, as shown in configuration 1700. When moved to another position along the track 1707, as shown in configuration 1706, the fan 1702 draws air in across the evaporator 1704 and expels air out the opening 1705. In the current embodiment, the track lies in a horizontal plane and both of these air outlets 1703 and 1705 are on the side of the heat pump casing 1601. In other embodiments, the fan 1702 may move along a track resting on a vertical plane such that in one position it's coupled to an opening on the side of the heat pump casing 1701, while in another position it's coupled to an opening on the top of the casing 1701. The movement of the fan is controlled by an actuator 1708 coupled to the controller 914 which may comprise a mechanical linkage, gearing, or other design which would be familiar to someone ordinarily skilled in the art. In some embodiments, the openings 1703 and 1705 may be coupled to dampers coupled to at least one actuator coupled to the controller 914 which can operatively move the damper positions relative to the openings in order to block or at least partially uncover each opening to help block or facilitate airflow, respectively. According to aspects and embodiments, the controlling of the fan can be done by the controller that is configured to control the position of the fan as well as controlling the fan to be on and off. It is appreciated however that the fan position may be controlled manually by a user either via the on-unit control panel 915 or remotely with wireless communication, via a smartphone application for example. According to aspects and embodiments, the controlling of the fan can be done by the controller that is configured to control the position of the fan in cooperation with the opening and closing of the respective air openings. In the preferred embodiment, air opening 1703 is thermally coupled to the ambient space around the heat pump water heater 900 while air opening 1705 is ducted via ducting 1709 to conditioned space within the home. In other embodiments, other ducting and/or airflow configurations may be used as would be familiar to one ordinarily skilled in the art. For instance, one opening may be ducted to conditioned space within the home while the other opening may be ducted to space outside of the home. By enabling the system to have more than one air opening serving as an outlet, the most desirable air sink for the heat pump assembly 1000 may be selected based on a combination of environmental conditions, consumer preferences, total home energy use, and other parameters as previously described.

Figure 18:
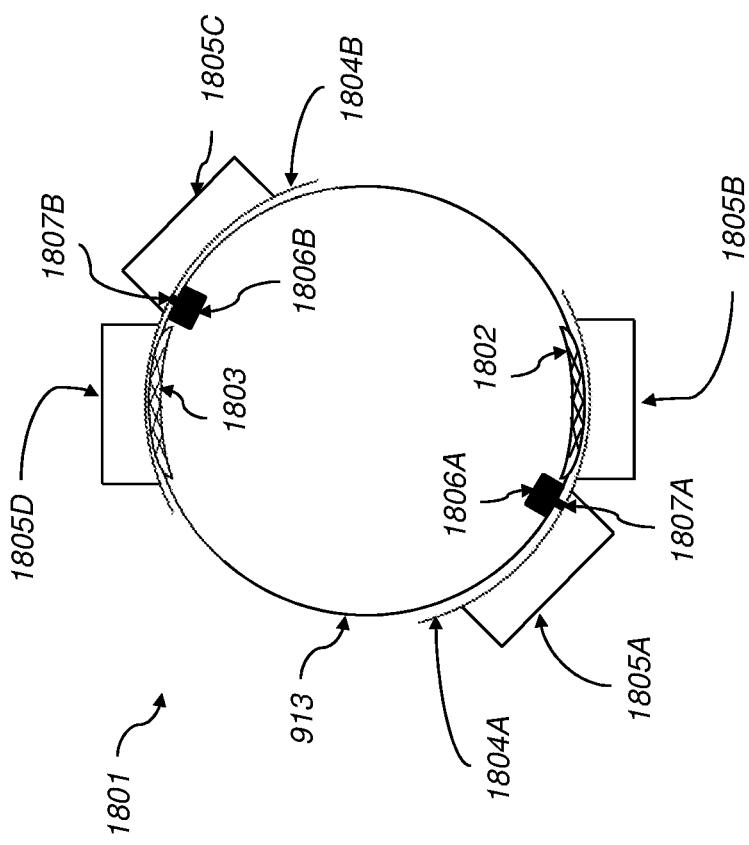
FIG. 18 illustrates a top-down perspective view of one embodiment of the heat pump assembly.

FIG. 18 illustrates a top-down perspective view of one embodiment of the heat pump assembly 1801. The heat pump assembly is enclosed within casing 913 of FIG. 9. In this embodiment the casing contains one air inlet 1802 and one air outlet 1803. The air openings may comprise a grille, mesh, or other partial or full opening which would be familiar to someone ordinarily skilled in the art. A first movable structure 1804A is located on the outside of the casing. The first movable structure includes at least two openings, 1805A and 1805B. The movable structure 1804A is positioned on the casing so that it may move circumferentially on the casing, thus allowing either one of its at least two openings, 1805A and 1805B, to be aligned with the air inlet 1802 to enable air to flow into the heat pump assembly 1801. In the illustrated top-down view FIG. 18, opening 1805B is aligned over inlet 1802. A second movable structure 1804B is also located on the outside of the casing. The second movable structure includes at least two openings, 1805C and 1805D. The structure 1804B is positioned on the casing so that it may move circumferentially, thus allowing either of its at least two openings, 1805C and 1805D, to be aligned with the air outlet 1803 to enable air to flow out of the heat pump assembly 1801. The openings 1805A, 1805B, 1805C, and 1805D may comprise a substructure raised from the movable structures 1804A and 1804B. This geometry may comprise an industry standard shape (e.g. cylindrical) and size (e.g. 8" in diameter) to enable rapid and inexpensive attachment of ductwork to the opening. Alternatively, the openings 1805A, 1805B, 1805C, and 1805D may be flat. Actuators 1806A and 1806B are disposed inside the casing and comprise a motor coupled to a rotating shaft 1807A and 1807B protruding through the casing and coupled to gearing to move the semicircular structure. In other embodiments, the actuators may be located in alternative locations and/or comprise a different mechanical design which would be familiar to someone otherwise ordinarily skilled in the art, such as a mechanical linkage or other design. The circular structure may comprise wheels on the bottom, not shown, to facilitate movement. Actuators 1806A and 1806B are controlled by controller 914.

Figure 19:
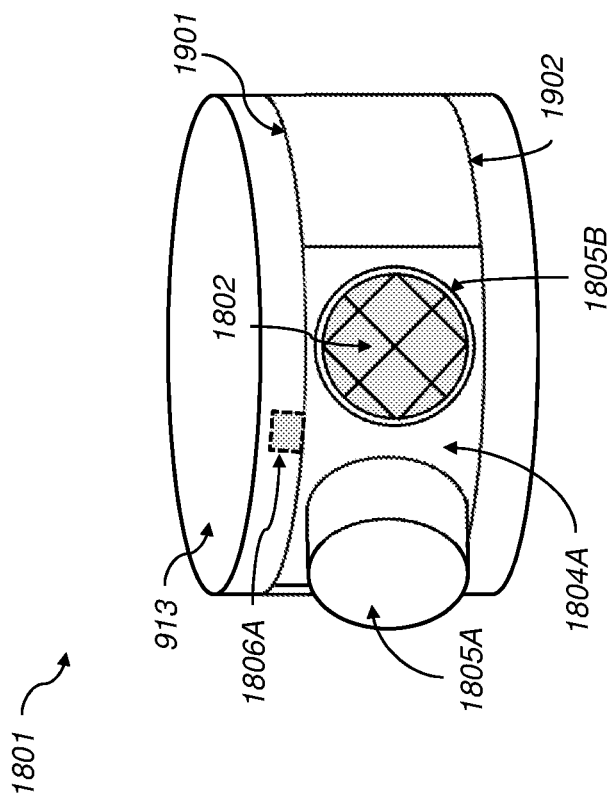
FIG. 19 illustrates a side perspective view of the heat pump assembly of FIG. 18.

FIG. 19 illustrates a side perspective view of the heat pump assembly 1801 disclosed in FIG. 18. The heat pump assembly is enclosed within casing 913 of FIG. 9. Movable structure 1804A is held in place by upper guide rail 1901 and lower guide rail 1902. As depicted in FIG. 19, movable structure 1804A is positioned so that air inlet 1802 receives air through air opening 1805B and not air opening 1805A. Actuator 1806A, located inside the casing 913, is illustrated by cut-away perspective.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively, or additionally, a computing device may include one or more general-purpose hardware processors programmed to perform the techniques pursuant to program instructions in firmware, memory, and/or other storage. Alternatively, or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 12:
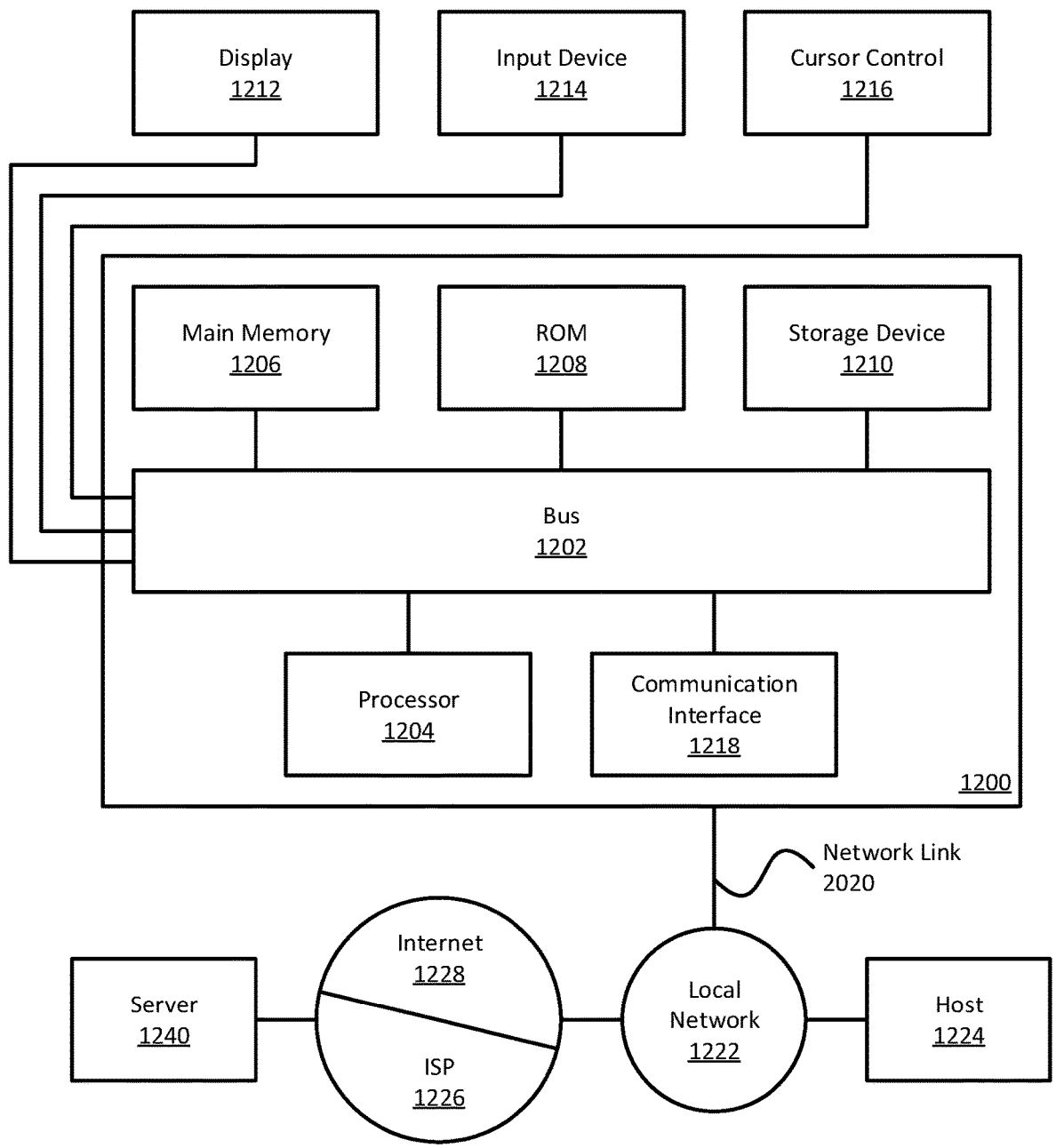
FIG. 12 is a block diagram of an example of a system for implementing aspects and embodiments of the methods and systems disclosed herein.

For example, FIG. 12 is a block diagram of an example of a computer system 1200 according to an embodiment. The controller and control processes disclosed herein can be implemented with the Computer system 1200 so as to provide a controller 1200. Computer system 1200 includes a bus 1202 or other communication mechanism for communicating information, and a hardware processor 1204 coupled with the bus 1202 for processing information. Hardware processor 1204 may be a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in one or more non-transitory storage media accessible to processor 1204, render computer system 1200 into a special-purpose machine that is customized to perform the operations specified in the instructions, so as to implement the system and processes disclosed herein.

Computer system 1200 further includes a read only memory (ROM) 1208 or other static storage device coupled to bus 1202 for storing static information and instructions for processor 1204. A storage device 1210, such as a magnetic disk or optical disk, or any other storage device of skill in the art, is provided and coupled to bus 1202 for storing information and instructions.

Computer system 1200 may be coupled via bus 1202 to a display 1212, such as a liquid crystal display (LCD), plasma display, electronic ink display, cathode ray tube (CRT) monitor, or any other kind of device for displaying information to a computer user. An input device 1214, including alphanumeric and other keys, may be coupled to bus 1202 for communicating information and command selections to processor 1204. Alternatively or additionally, computer system 1200 may receive user input via a cursor control 1216, such as a mouse, a trackball, a trackpad, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Alternatively, or additionally, computer system 1200 may include a touchscreen. Display 1212 may be configured to receive user input via one or more pressure-sensitive sensors, multi-touch sensors, and/or gesture sensors. Alternatively, or additionally, computer system 1200 may receive user input via a microphone, video camera, and/or some other kind of user input device (not shown).

Computer system 1200 may implement the techniques described herein using customized hard-wired logic, one or more ASICs or FPGAs, firmware, and/or program logic which in combination with other components of computer system 1200 causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. Alternatively, or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 1202. Transmission media may also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer may load the instructions into its dynamic memory and send the instructions over a network, via a network interface controller (NIC), such as an Ethernet controller or Wi-Fi controller. A NIC local to computer system 1200 may receive the data from the network and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222, and communication interface 1218.

The received code may be executed by processor 1204 as it is received, and/or stored in storage device 1210, or other non-volatile storage for later execution.

It is appreciated that the controller 1200 may include more or fewer components than the components illustrated in FIG. 12. The components illustrated in FIG. 12 may be local to or remote from each other. The components illustrated in FIG. 12 may be implemented in software and/or hardware. Each component may be distributed over multiple applications and/or machines. Multiple or all of the components may be combined into one application and/or device. In a preferred embodiment all of the components are part of a single user device. Operations described with respect to one component may instead be performed by another component.

It is appreciated that the storage device may be any kind of device, or set of devices, on which data is to be stored and secured from unauthorized access, e.g., as encrypted data. For example, a storage device may include a hard disk drive (HDD), solid state drive (SSD), persistent memory, disc drive (e.g., compact disc (CD) or digital video disc (DVD)), universal serial bus (USB) flash memory, and/or another kind of storage device or combination thereof. In some examples, a storage device may include multiple physical devices operatively connected by an abstraction layer, such as multi-drive network-attached storage (NAS), cloud storage, a data center, distributed storage in a local area network (LAN), peer-to-peer sharing infrastructure, etc. The storage device may be a removable device (i.e., a device that is removable and portable between access points, such as a USB stick or external SSD) or a fixed device (i.e., a device installed within an access point, such as within a NAS device, rack server, laptop, desktop, tablet, smartphone, etc.). In general, techniques described herein may apply to any kind of storage system in which data is to be stored and secured.

Controller 1200 can include a set of hardware and/or software configured to mediate access to data stored by the storage device. The device is configured to connect to both an access device and the storage device, thus passing data between the two devices. As described herein, the device controller includes components that allow one or more users to generate and/or access the data.

The controller device 1200 can include or be directly connected to an access device. Alternatively, the device 1200 may include a plug (e.g., a USB plug, Lightning plug, or another kind of plug) configured to connect to a corresponding port (e.g., a USB port, Lightning port, or another kind of port) of the access device. Alternatively, the device may include a port configured to receive one end of a cable that extends from the device 1200 to the access device. Alternatively, or additionally, the device 1200 may be configured to communicated with the access device 1200 wirelessly (e.g., using Bluetooth, Wi-Fi, or another kind of wireless protocol). The device 1200 may be configured to connect with the access device 1200 in many different ways.

The device 1200 may include or may be directly connected to the storage device. Alternatively, to connect with the storage device, the device 1200 may include a port (e.g., a USB port, Lightning port, or another kind of port) configured to receive a corresponding plug (e.g., a USB plug, Lightning plug, or another kind of plug) of the storage device. Alternatively, the device 1200 may include a port configured to receive one end of a cable that extends from the device 1200 to the storage device 1200. Alternatively, or additionally, the device 1200 may be configured to communicated with the storage device 1200 wirelessly (e.g., using Bluetooth, Wi-Fi, or another kind of wireless protocol). The device 1200 may be configured to connect with the storage device in many different ways. As one non-limiting example, the device 1200 may include a USB port configured to receive a USB plug and/or USB cable, the other end of the cable being connected to a storage device. The device 1200 may thus support a wide range of storage devices with USB connectivity.

The device 1200 may include one or more biometric readers. A biometric reader refers to a set of hardware, controlled at least in part by software and/or firmware, configured to obtain biometric data from a user. Biometric data may include, for example, one or more of: a fingerprint scan; an eye scan (e.g., iris and/or retina data); a facial scan; a nucleic acid sequence (e.g., obtained from blood, saliva, or another source); an optic response (e.g., representing one or more responses from a user's ear canal at a particular frequency or range of frequencies); voice data; and/or another kind of biometric data or combination thereof. The device 1200 may be configured to store biometric data for one or more users authorized to access data stored by the storage device. Alternatively, or additionally, the device 1200 may be configured to obtain biometric data from a biometric reader. The biometric reader may be part of the device 1200 or may not be part of the device. For example, an access device may include a biometric reader.

The device 1200 may include one or more positioning systems. A positioning system refers to a set of hardware, controlled at least in part by software and/or firmware, configured to determine an approximate position of the device. For example, a positioning system may be a global positioning system (GPS), a short-range positioning system (e.g., using Bluetooth®, Wi-Fi, and/or another short-range signaling system or combination thereof), or another kind of positioning system. In some examples, a positioning system provides high-resolution positioning data. For example, a positioning system may include a "dead-reckoning" (DR) GPS chip, capable of providing positional accuracy on a scale of meters, centimeters, or another relatively precise scale. The GPS may be configured to determine an altitude of the device. Alternatively, or additionally, the user device may include an altimeter, atmospheric pressure sensor, and/or other component configured to measure or approximate an altitude of the device.

The device 1200 may include one or more wireless receivers. A wireless receiver refers to a set of hardware, controlled at least in part by software and/or firmware, configured to receive information wirelessly from one or more devices to the storage device. The wireless receiver may be a wireless transceiver that is also capable of transmitting data to an external device. The wireless receiver may be configured to detect the presence of an authentication device, within a supported range (e.g., operating distance or radius) of the wireless receiver. For example, the authentication device may be a near-field communication (NFC) device, Bluetooth® device, or other kind of device configured to supply its identity to the wireless receiver when in relatively close proximity to the wireless receiver and/or when requested by the wireless receiver. Presence of the authentication device in relative proximity to the user device may serve as an authentication factor. In preferred embodiment, the device itself may also serve as an authentication device.

In an embodiment, the device 1200 includes a security subsystem. The security subsystem is a set of hardware, software, and/or firmware configured to execute data encryption and decryption operations as described herein. Specifically, the security subsystem uses one or more authentication factors (e.g., biometric data, position data, presence of one or more authentication devices, one or more passwords and/or personal identification numbers (PINs), and/or another authentication factor or combination thereof) to secure data. The storage subsystem may use one or more authentication factors as an encryption/decryption key. For example, given a digital representation of one or more users' fingerprint(s) and/or other biometric credential, the device may use that digital representation as a key for encrypting data. The same fingerprint(s) and/or other biometric credential may then be required as a key to decrypt the data. Using an authentication factor (e.g., a fingerprint) as an encryption/decryption key is more secure than systems that only require one or more authentication factors to access data, but use a separate key (which may be accessible by third parties) for encryption/decryption.

In an embodiment, the device 1200 includes internal storage configured to store user data. The user device may be configured to perform one or more encryption and/or decryption operations described herein with respect to data stored in the internal storage, while also supporting an external storage device. For example, the user device 1200 may be initially provided with a certain amount of included internal storage that is securable using techniques described herein, and also configured to support a separately provided external storage device. The device 1200 may thus allow for storing data without requiring an external storage device, while also optionally supporting the use of an external storage device. An external storage device may support substantially more storage than the internal storage.

An access device is used to store data, access data, and/or manage users of the device, responsive to user input to a user interface. Many different kinds of access devices may be used, depending on the kind of device 1200 used. The device 1200 may itself include the access device and the user interface. For example, the device 1200 may include a built-in screen and one or more hardware interfaces (e.g., a haptic interface, microphone, keyboard, etc.) for receiving user input. The device 1200 may include a set of instructions for presenting the user interface. For example, the user device 1200 may include executable code that generates instructions for rendering the user interface, hypertext markup language (HTML) accessible by a web browser, and/or another kind of instructions for presenting the user interface.

In general, a user interface renders user interface elements and receives input via user interface elements. A user interface may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of the user interface may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively, or additionally, aspects of a user interface 1220 may be specified in one or more other languages, such as Java, Python, Perl, C, C++, and/or any other language or combination thereof.

Components of the controller 1200 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A water heating system, comprising:
a tank configured for storing water;
at least one of an electric heating element and/or a heat pump assembly for heating the water in the tank; and
a controller operatively coupled to the at least one of the electric heating element and the heat pump assembly that is configured to control operation of the water heating system;
wherein the controller comprises an interface configured for gathering information comprising user preferences for the water heating system and specifications for where the water heating system is physically configured within the home;

wherein the controller is configured to process the information to control the water heater system to operate according to the information.

2. The water heating system of claim 1, wherein the controller comprises at least one of a plurality of predefined operating modes and wherein the user preferences comprise selection of predefined operating modes for heat pump assembly.

3. The water heating system of claim 1, wherein the information about the specifications for the energy-related systems of the home comprises any of information about a heating system, a cooling system, distributed generation systems, back-up power sources, presence of intelligent electrical panels, and presence of other smart home controller technologies.

4. The water heating system of claim 1, wherein the information about the specifications for where the water heating system is physically configured within the home comprises any of its location within the home and outside of the home.

5. The water heating system of claim 1, wherein the controller comprises a set up mode that includes at least one of a plurality of operating modes including distributed generation mode, a back-up power supply mode, a minimum GHG content mode, a space heating and cooling mode, and an air inlet and outlet control mode that can be activated or deactivated by a user.

6. The water heating system of claim 5, wherein the controller is configured to allow the user to enable or disable at least one mode of the plurality of operating modes.

7. The water heater system of claim 5, wherein the distributed generation mode comprises receiving ay of utility rate information; weather forecast information; wind generation production forecast information; solar system production forecast information; voltage information; and distributed generation system information from the distributed generation system or from a smart electrical panel, and a smart home controller or equivalent; and processing this information to control the water heater to increase or decrease the coincidence of water heating with a distributed generation system.

8. The water heater system of claim 5, wherein the backup power supply mode comprises receiving any of back-up power supply information directly from the back-up power supply system or from a user, a smart electrical panel, a smart home controller, a voltage sensor, and an outage duration analysis; and processing this information to control the water heater to increase or decrease energy consumption of water heating while the heating system is operating by a back-up power supply.

9. The water heating system of claim 1,
wherein the interface is further configured for gathering greenhouse gas intensity information for a location in which the water heating system is installed;
wherein the user preferences comprise that the water heating system is to operate with lowest possible greenhouse gas emissions;
wherein the controller comprises a minimum greenhouse gas (GHG) content mode and is configured to process the information to control the water heater system to operate according to the information; and
wherein the minimum greenhouse gas minimization mode comprises receiving any of information regarding current greenhouse gas intensity or upcoming greenhouse gas intensity of local electricity and processing this information to control the water heater to reduce water heating during times that supplied electricity has carbon content greater than a first threshold and increase water heating during times the electricity has a carbon content that is below a second threshold.

10. The water heater system of claim 5, wherein the space heating and cooling system mode comprises receiving any of a weather forecast and space heating and cooling system information from any of the space heating and cooling system, a smart electrical panel, and a smart home controller; and processing this information to decrease energy consumption of water heating when cooling is provided.

11. The water heater system of claim 5, wherein the inlet outlet control mode comprises receiving any of information about the space heating and cooling systems, information about ducting configuration, information about user preference settings, a weather forecast, and space heating and cooling system operational information from any of space heating and cooling system, a smart electrical panel, and a smart home controller, and processing this information to alter the ducting configuration to optimize performance according to user preferences.

12. The water heating system of claim 1, further comprising a communication interface configured to collect external information from the internet.

13. The water heating system of claim 1, wherein the controller is further configured to receive data from any of an intelligent electric panel, a distributed generation system, a back-up power source that provides information on one or more energy using systems in the home, and uses this information to further control the water heating system.

14. The water heating system of claim 1, wherein the water heating system is a heat pump water heater and further comprises a casing enclosing the heat pump system, the casing including at least two air openings; and
wherein the interface is further configured to receive information about the configuration of the heat pump water heater and the at least two air openings;
wherein the information further comprises whether any of the at least two air openings are connected to ductwork, how many openings the ductwork has, whether the ductwork has controllable dampers to open and close the openings, whether any of the controllable dampers are controlled by actuators, where the air openings are ducted to, what type of heating and cooling system is used in the home, and user preferences for how the heat pump water heater is to operate; and
wherein the controller processes the information to send a control signal to the dampers in the ductwork or to a user for hand operation of the dampers, and the processor also processes the information to control the heat pump water heater system.

15. The water heating system of claim 1, wherein the water heating system is a heat pump water heater and further comprises a casing enclosing the heat pump system, the casing including at least three air openings for receiving air through at least a first air opening and exhausting air through at least a second air opening;
wherein the system further comprises at least one controllable damper and actuator within the casing, the damper being coupled to at least one of the air openings such that its position is movable and to enable or prevent airflow through the at least one opening;
wherein the interface is further configured to receive information about a configuration of the heat pump water heater and the at least three air openings including at least one of which of the at least three air openings are connected to ductwork and where the air openings are ducted to, what type of heating and cooling system is used with the heat pump water heater system, and user preferences for how the heat pump water heater is to operate; and wherein the controller processes the information to control the actuator to control the position of the damper, and the controller processes the information to control the heat pump water heater system.

16. The water heating system of claim 15, further comprising at least one temperature sensor inside the casing that measures air temperature from the air openings, the temperature sensor in communication with the controller, and wherein the controller processes the information to control the heat pump water heater system.

17. The water heating system of claim 15, wherein the controller is configured to estimate an air temperature from air coming from air openings based on sensors in the water heating system, including at least one of a temperature sensor in the tank, electrical consumption of the compressor, and temperature of the refrigerant returning from the compressor, and wherein the controller processes the information to control the heat pump water heater system.

18. The water heating system of claim 1, wherein the water heating system is a heat pump water heater and further comprises a casing enclosing the heat pump system, the casing including at least two air openings, and at least one movable structure coupled to an exterior of the casing enclosing the heat pump system, wherein the at least one movable structures contains at least two openings, the movable structure constructed and arranged to be moved to position each of the at least two openings of the movable structure over at least one of the at least two openings in the casing for receiving or exhausting air.

19. The water heating system of claim 1, wherein the controller is further configured for gathering information comprising at least one of specifications for energy-related systems of a home in which the water heating system is installed, environmental parameters for a location in which the water heating system is installed, greenhouse gas intensity for a location in which the water heating system is installed, and information regarding electrical blackouts for a location in which the water heating system is installed.

20. The water heating system of claim 1, wherein the user preferences further comprise at least one of that the water heating system is to provide a highest possible efficiency of the overall home, that the water heating system is to operate with lowest possible greenhouse gas emissions, that the water heating system is to minimize greenhouse gas emissions of the home overall, that the water heating system is to operate with the fastest possible heating, and that the water heating system is to balance these user preferences.

* * * * *